United States Patent
Oehring et al.

(10) Patent No.: US 12,085,017 B2
(45) Date of Patent: Sep. 10, 2024

(54) SYSTEM FOR GAS COMPRESSION ON ELECTRIC HYDRAULIC FRACTURING FLEETS

(71) Applicant: U.S. Well Services, Inc., Houston, TX (US)

(72) Inventors: Jared Oehring, Houston, TX (US); Brandon N. Hinderliter, Houston, TX (US)

(73) Assignee: US Well Services, LLC, Houston, TX (US)

( * ) Notice: Subject to any disclaimer, the term of this patent is extended or adjusted under 35 U.S.C. 154(b) by 0 days.

(21) Appl. No.: 16/458,696

(22) Filed: Jul. 1, 2019

(65) Prior Publication Data

US 2019/0323428 A1 Oct. 24, 2019

Related U.S. Application Data

(62) Division of application No. 15/356,436, filed on Nov. 18, 2016.
(Continued)

(51) Int. Cl.
*F02C 7/236* (2006.01)
*E21B 43/26* (2006.01)
(Continued)

(52) U.S. Cl.
CPC ............ *F02C 7/05* (2013.01); *E21B 43/2607* (2020.05); *F02C 6/00* (2013.01); *F02C 7/22* (2013.01); *F02C 7/236* (2013.01)

(58) Field of Classification Search
CPC ......... F02C 7/22; F02C 7/236; E21B 43/2607
See application file for complete search history.

(56) References Cited

U.S. PATENT DOCUMENTS

| 1,541,601 A | 6/1925 | Tribe |
| 1,656,861 A | 1/1928 | Leonard |

(Continued)

FOREIGN PATENT DOCUMENTS

| CA | 2406801 | 11/2001 |
| CA | 2707269 | 12/2010 |

(Continued)

OTHER PUBLICATIONS

Karim, Ghazi A., Dual-Fuel Diesel Engines, (2015), Taylor & Francis, pp. 62-63, Retrieved from https://app.knovel.com/hotlink/toc/id:kpDFDE0001/dual-fuel-diesel-engines/dual-fuel-diesel-engines (Year: 2015).*

(Continued)

*Primary Examiner* — Todd E Manahan
*Assistant Examiner* — Marc J Amar
(74) *Attorney, Agent, or Firm* — Hogan Lovells US LLP

(57) ABSTRACT

Embodiments relate to hydraulic fracturing equipment powered by one or more natural gas turbine generators. Natural gas from a supply line is released via a valve into a turbine gas line. The turbine gas line includes one or more regulators to reduce the pressure of the natural gas stream in the turbine gas line to a pressure or pressure range optimum for one or more gas compressors. The gas compressors increase the pressure of the natural gas stream, which is then directed to one or more natural gas turbine generators. The natural gas turbine generators combust the natural gas to produce electricity, which powers electric hydraulic fracturing equipment.

5 Claims, 10 Drawing Sheets

Related U.S. Application Data

(60) Provisional application No. 62/258,055, filed on Nov. 20, 2015.

(51) Int. Cl.
*F02C 6/00* (2006.01)
*F02C 7/05* (2006.01)
*F02C 7/22* (2006.01)

(56) References Cited

U.S. PATENT DOCUMENTS

| | | |
|---|---|---|
| 1,671,436 A | 5/1928 | Melott |
| 1,743,771 A | 1/1930 | Hall |
| 1,967,466 A | 7/1934 | Damsel |
| 2,004,077 A | 6/1935 | McCartney |
| 2,095,243 A * | 10/1937 | Diescher ............. F17D 1/02 |
| | | 137/565.33 |
| 2,183,364 A | 12/1939 | Bailey |
| 2,220,622 A | 11/1940 | Aitken |
| 2,244,106 A | 6/1941 | Granberg |
| 2,248,051 A | 7/1941 | Armstrong |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 2,976,025 A | 3/1961 | Pro |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,347,570 A | 10/1967 | Roessler |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 3,967,841 A | 7/1976 | Kendrick |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,432,064 A | 2/1984 | Barker |
| 4,442,665 A | 4/1984 | Fick |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,601,629 A | 7/1986 | Zimmerman |
| 4,676,063 A | 6/1987 | Goebel et al. |
| 4,759,674 A | 7/1988 | Schroder |
| 4,768,884 A | 9/1988 | Elkin |
| 4,783,038 A | 11/1988 | Gilbert |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,486,047 A | 1/1996 | Zimmerman |
| 5,517,822 A * | 5/1996 | Haws ............. F01K 17/025 |
| | | 60/618 |
| 5,548,093 A | 8/1996 | Sato |
| 5,549,285 A | 8/1996 | Collins |
| 5,590,976 A | 1/1997 | Kilheffer et al. |
| 5,606,853 A | 3/1997 | Birch |
| 5,655,361 A | 8/1997 | Kishi |
| 5,699,839 A * | 12/1997 | Dehne ............. F17C 6/00 |
| | | 141/2 |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,813,455 A | 9/1998 | Pratt et al. |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann et al. |
| 6,315,523 B1 | 11/2001 | Mills |
| 6,406,011 B1 | 6/2002 | Kosar |
| 6,442,942 B1 | 9/2002 | Kopko |
| 6,477,852 B2 | 11/2002 | Dodo |
| 6,484,490 B1 * | 11/2002 | Olsen ............. F02C 7/22 |
| | | 60/39.281 |
| 6,491,098 B1 | 12/2002 | Dallas |
| 6,510,695 B1 | 1/2003 | Fisher |
| 6,529,135 B1 | 3/2003 | Bowers et al. |
| 6,585,455 B1 | 7/2003 | Petersen et al. |
| 6,626,646 B2 * | 9/2003 | Rajewski ............. F04C 18/16 |
| | | 417/231 |
| 6,719,900 B2 | 4/2004 | Hawkins |
| 6,765,304 B2 | 7/2004 | Baten et al. |
| 6,776,227 B2 | 8/2004 | Beida |
| 6,788,022 B2 | 9/2004 | Sopko |
| 6,802,690 B2 | 10/2004 | Han |
| 6,808,303 B2 | 10/2004 | Fisher |
| 6,837,910 B1 | 1/2005 | Yoshikawa |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,279,655 B2 | 10/2007 | Blutke |
| 7,308,933 B1 | 12/2007 | Mayfield |
| 7,309,835 B2 | 12/2007 | Morrison |
| 7,312,593 B1 | 12/2007 | Streicher et al. |
| 7,336,514 B2 | 2/2008 | Amarillas |
| 7,341,287 B2 | 3/2008 | Gibb |
| 7,445,041 B2 | 11/2008 | O'Brien |
| 7,494,263 B2 | 2/2009 | Dykstra |
| 7,500,642 B2 | 3/2009 | Cunningham |
| 7,525,264 B2 | 4/2009 | Dodge |
| 7,563,076 B2 | 7/2009 | Brunet |
| 7,581,379 B2 * | 9/2009 | Yoshida ............. F01D 15/10 |
| | | 60/39.463 |
| 7,675,189 B2 | 3/2010 | Grenier |
| 7,683,499 B2 | 3/2010 | Saucier |
| 7,717,193 B2 | 5/2010 | Egilsson |
| 7,755,310 B2 | 7/2010 | West et al. |
| 7,770,396 B2 | 8/2010 | Roby |

(56) References Cited

U.S. PATENT DOCUMENTS

| | | |
|---|---|---|
| 7,795,830 B2 | 9/2010 | Johnson |
| 7,807,048 B2 | 10/2010 | Collette |
| 7,835,140 B2 | 11/2010 | Mori |
| 7,845,413 B2 | 12/2010 | Shampine |
| 7,900,893 B2 | 3/2011 | Teurlay |
| 7,926,562 B2 | 4/2011 | Poitzsch |
| 7,940,039 B2 | 5/2011 | de Buda |
| 7,894,757 B2 | 7/2011 | Keast |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,221,513 B2 | 7/2012 | Ariyapadi |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| RE44,444 E | 8/2013 | Dole |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee |
| 8,616,005 B1 * | 12/2013 | Cousino, Sr. ............ F02C 1/002 60/772 |
| 8,616,274 B2 | 12/2013 | Belcher |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel |
| 9,260,253 B2 | 2/2016 | Naizer |
| 9,322,239 B2 | 4/2016 | Angeles Boza et al. |
| 9,324,049 B2 | 4/2016 | Thomeer |
| 9,340,353 B2 | 5/2016 | Oren |
| 9,353,593 B1 | 5/2016 | Lu et al. |
| 9,366,114 B2 | 6/2016 | Coli et al. |
| 9,410,410 B2 | 8/2016 | Broussard |
| 9,450,385 B2 | 9/2016 | Kristensen |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring |
| 9,790,858 B2 | 10/2017 | Kanebako |
| 9,840,901 B2 | 12/2017 | Oehring |
| 9,863,228 B2 | 1/2018 | Shampine et al. |
| 9,893,500 B2 | 2/2018 | Oehring |
| 9,903,190 B2 | 2/2018 | Conrad |
| 9,909,398 B2 | 3/2018 | Pham |
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring |
| 10,408,031 B2 | 9/2019 | Oehring |
| 10,415,332 B2 | 9/2019 | Morris |
| 10,436,026 B2 | 10/2019 | Ounadjela |
| 10,526,882 B2 | 1/2020 | Oehring |
| 10,627,003 B2 | 4/2020 | Dale et al. |
| 10,648,270 B2 | 5/2020 | Brunty et al. |
| 10,648,311 B2 | 5/2020 | Oehring et al. |
| 10,669,471 B2 | 6/2020 | Schmidt et al. |
| 10,669,804 B2 | 6/2020 | Kotrla |
| 10,686,301 B2 | 6/2020 | Oehring et al. |
| 10,690,131 B2 | 6/2020 | Rashid |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring |
| 10,988,998 B2 | 4/2021 | Fischer et al. |
| 11,091,992 B2 | 8/2021 | Broussard |
| 2001/0000996 A1 | 5/2001 | Grimland et al. |
| 2002/0095940 A1 * | 7/2002 | Yamanaka ............... F02C 7/185 60/806 |
| 2002/0169523 A1 | 11/2002 | Ross et al. |
| 2003/0056514 A1 * | 3/2003 | Lohn ....................... F02C 9/40 60/734 |
| 2003/0057704 A1 | 3/2003 | Baten |
| 2003/0079875 A1 | 5/2003 | Weng |
| 2003/0138327 A1 | 7/2003 | Jones et al. |

(56) References Cited

U.S. PATENT DOCUMENTS

| | | |
|---|---|---|
| 2004/0040746 A1 | 3/2004 | Niedermayr et al. |
| 2004/0045703 A1 | 3/2004 | Hooper et al. |
| 2004/0102109 A1 | 5/2004 | Cratty et al. |
| 2004/0167738 A1 | 8/2004 | Miller |
| 2005/0061548 A1 | 3/2005 | Hooper |
| 2005/0116541 A1 | 6/2005 | Seiver |
| 2005/0201197 A1 | 9/2005 | Duell et al. |
| 2005/0274508 A1 | 12/2005 | Folk |
| 2006/0052903 A1 | 3/2006 | Bassett |
| 2006/0065319 A1 | 3/2006 | Csitari |
| 2006/0109141 A1 | 5/2006 | Huang |
| 2007/0125544 A1 | 6/2007 | Robinson |
| 2007/0131410 A1 | 6/2007 | Hill |
| 2007/0187163 A1 | 8/2007 | Cone |
| 2007/0201305 A1 | 8/2007 | Heilman |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1* | 4/2008 | Mantei ............... F04B 35/06 417/234 |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1* | 10/2008 | Ochoa ............... F04B 17/03 166/68.5 |
| 2008/0264649 A1 | 10/2008 | Crawford |
| 2008/0277120 A1 | 11/2008 | Hickie |
| 2008/0288115 A1 | 11/2008 | Rusnak |
| 2009/0045782 A1 | 2/2009 | Datta |
| 2009/0065299 A1 | 3/2009 | Vito |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek |
| 2009/0093317 A1 | 4/2009 | Kajiwara et al. |
| 2009/0095482 A1 | 4/2009 | Surjaatmadja |
| 2009/0114392 A1 | 5/2009 | Tolman |
| 2009/0145611 A1 | 6/2009 | Pallini, Jr. |
| 2009/0153354 A1 | 6/2009 | Daussin |
| 2009/0188181 A1 | 7/2009 | Forbis |
| 2009/0200035 A1* | 8/2009 | Bjerkreim ............. E21B 43/01 166/335 |
| 2009/0260826 A1 | 10/2009 | Sherwood |
| 2009/0308602 A1 | 12/2009 | Bruins |
| 2009/0315297 A1 | 12/2009 | Nadeau |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0193057 A1 | 8/2010 | Garner |
| 2010/0250139 A1 | 9/2010 | Hobbs |
| 2010/0281876 A1 | 11/2010 | Khan |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case |
| 2011/0081268 A1 | 4/2011 | Ochoa et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0175397 A1 | 7/2011 | Amrine |
| 2011/0197988 A1 | 8/2011 | Van Vliet |
| 2011/0241590 A1 | 10/2011 | Horikoshi |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli |
| 2013/0009469 A1 | 1/2013 | Gillett |
| 2013/0025706 A1 | 1/2013 | DeGaray et al. |
| 2013/0051971 A1 | 2/2013 | Wyse et al. |
| 2013/0078114 A1 | 3/2013 | Van Rijswick |
| 2013/0138254 A1 | 5/2013 | Seals |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1* | 10/2013 | Yu ............... F02C 7/22 60/776 |
| 2013/0284278 A1 | 10/2013 | Winborn |
| 2013/0284455 A1 | 10/2013 | Kajaria et al. |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1* | 3/2014 | Hains ............... F02C 7/22 137/2 |
| 2014/0077607 A1 | 3/2014 | Clarke |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1* | 5/2014 | Broussard ............ F01D 15/10 166/66.4 |
| 2014/0174717 A1 | 6/2014 | Broussard et al. |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0294603 A1 | 10/2014 | Best |
| 2014/0379300 A1 | 12/2014 | Devine |
| 2015/0027712 A1* | 1/2015 | Vicknair ............... F17D 1/08 166/305.1 |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1* | 5/2015 | Shaaban ............... F17C 7/04 122/31.1 |
| 2015/0144336 A1 | 5/2015 | Hardin |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |

(56) References Cited

U.S. PATENT DOCUMENTS

| | | |
|---|---|---|
| 2015/0252661 A1 | 9/2015 | Glass |
| 2015/0300145 A1 | 10/2015 | Coli et al. |
| 2015/0300336 A1* | 10/2015 | Hernandez ............ F04B 17/03 |
| | | 417/45 |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0006311 A1 | 1/2016 | Li |
| 2016/0032703 A1 | 2/2016 | Broussard et al. |
| 2016/0076533 A1* | 3/2016 | Moffitt, Jr. ............ B67D 7/72 |
| | | 137/565.13 |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0230660 A1 | 8/2016 | Zeitoun et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1* | 9/2016 | Zhang .................... F02C 7/22 |
| 2016/0281484 A1 | 9/2016 | Lestz |
| 2016/0290114 A1 | 10/2016 | Oehring |
| 2016/0290563 A1* | 10/2016 | Diggins ................. F17C 7/02 |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1* | 2/2017 | Vankouwenberg .. B01D 47/021 |
| 2017/0051732 A1 | 2/2017 | Hemandez et al. |
| 2017/0074076 A1 | 3/2017 | Joseph et al. |
| 2017/0082033 A1* | 3/2017 | Wu ......................... F02C 3/04 |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1* | 6/2017 | Bickert .................... F02C 7/22 |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ciezobka |
| 2017/0226839 A1 | 8/2017 | Broussard |
| 2017/0226842 A1 | 8/2017 | Omont |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye |
| 2017/0328179 A1 | 11/2017 | Dykstra |
| 2017/0369258 A1 | 12/2017 | DeGaray |
| 2017/0370639 A1* | 12/2017 | Bardon ................. F25J 1/0212 |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0156210 A1 | 6/2018 | Oehring |
| 2018/0181830 A1 | 6/2018 | Luharuka et al. |
| 2018/0183219 A1 | 6/2018 | Oehring |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1* | 11/2018 | Rutsch .................... C02F 1/048 |
| 2018/0313677 A1 | 11/2018 | Warren et al. |
| 2018/0320483 A1 | 11/2018 | Zhang |
| 2018/0343125 A1 | 11/2018 | Clish |
| 2018/0363437 A1 | 12/2018 | Coli |
| 2018/0363640 A1 | 12/2018 | Kajita et al. |
| 2018/0366950 A1 | 12/2018 | Pedersen et al. |
| 2019/0003329 A1 | 1/2019 | Morris |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0316447 A1 | 10/2019 | Oehring |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0232454 A1 | 7/2020 | Chretien |
| 2020/0325760 A1 | 10/2020 | Markham |
| 2020/0350790 A1 | 11/2020 | Luft et al. |

FOREIGN PATENT DOCUMENTS

| | | |
|---|---|---|
| CA | 2707269 X | 12/2010 |
| CA | 2482943 | 5/2011 |
| CA | 3050131 | 11/2011 |
| CA | 8050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |

(56) References Cited

FOREIGN PATENT DOCUMENTS

| | | |
|---|---|---|
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101977016 | 2/2011 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 00/47893 | 8/2000 |
| WO | 2009046280 | 4/2009 |
| WO | 2012/051705 | 4/2012 |
| WO | 2014/116761 | 7/2014 |
| WO | 2014177346 | 11/2014 |
| WO | 2016/144939 | 9/2016 |
| WO | 2016/160458 | 10/2016 |
| WO | 2018044307 A1 | 3/2018 |
| WO | 2018213925 A1 | 11/2018 |
| WO | 2019210417 | 11/2019 |

OTHER PUBLICATIONS

Albone, Trevor. "Mobile Compressor Stations for Natural Gas Transmission Service.", 1967, Turbo Expo: Power for Land, Sea, and Air. vol. 79887. American Society of Mechanical Engineers, 1-10. (Year: 1967).*
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 on Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action issued Feb. 12, 2019 in related U.S. Appl. No. 16/170,695.
International Search Report and Written Opinion dated Feb. 15, 2019 in related PCT Patent Application No. PCT/US18/63977.
International Search Report and Written Opinion dated Mar. 5, 2019 in related PCT Patent Application No. PCT/US18/63970.
Non-Final Office Action issued Feb. 25, 2019 in related U.S. Appl. No. 16/210,749.
Non-Final Office Action issued Mar. 6, 2019 in related U.S. Appl. No. 15/183,387.
Office Action mailed Jan. 30, 2019 in related Canadian Patent Application No. 2,936,997.
Office Action mailed Mar. 1, 2019 in related Canadian Patent Application No. 2,943,275.
International Search Report and Written Opinion mailed Apr. 10, 2019 in corresponding PCT Application No. PCT/US2019/016635.
Notice of Allowance mailed Apr. 23, 2019 in corresponding U.S. Appl. No. 15/635,028.
International Search Report and Written Opinion mailed Jul. 9, 2019 in corresponding PCT Application No. PCT/US2019/027584.
Office Action mailed Jun. 11, 2019 in corresponding U.S. Appl. No. 16/210,749.
Office Action mailed May 10, 2019 in corresponding U.S. Appl. No. 16/268,030.
Canadian Office Action mailed May 30, 2019 in corresponding CA Application No. 2,833,711.
Canadian Office Action mailed Jun. 20, 2019 in corresponding CA Application No. 2,964,597.
Office Action mailed Jun. 7, 2019 in corresponding U.S. Appl. No. 16/268,030.

(56) References Cited

OTHER PUBLICATIONS

International Search Report and Written Opinion mailed Sep. 11, 2019 in related PCT Application No. PCT/US2019/037493.
Office Action mailed Aug. 19, 2019 in related U.S. Appl. No. 15/356,436.
Office Action mailed Oct. 2, 2019 in related U.S. Appl. No. 16/152,732.
Office Action mailed Sep. 11, 2019 in related U.S. Appl. No. 16/268,030.
Office Action mailed Oct. 11, 2019 in related U.S. Appl. No. 16/385,070.
Office Action mailed Sep. 3, 2019 in related U.S. Appl. No. 15/994,772.
Office Action mailed Sep. 20, 2019 in related U.S. Appl. No. 16/443,273.
Canadian Office Action mailed Oct. 1, 2019 in related Canadian Patent Application No. 2,936,997.
Non-Final Office Action issued in corresponding U.S. Appl. No. 16/170,695 dated Jun. 7, 2019.
Non-Final Office Action issued in corresponding U.S. Appl. No. 16/268,030 dated May 10, 2019.
Final Office Action issued in corresponding U.S. Appl. No. 16/210,749 dated Jun. 11, 2019.
International Search Report and Written Opinion mailed Jan. 2, 2020 in related PCT Application No. PCT/US19/55325.
Notice of Allowance mailed Jan. 9, 2020 in related U.S. Appl. No. 16/570,331.
Non-Final Office Action mailed Dec. 23, 2019 in related U.S. Appl. No. 16/597,008.
Non-Final Office Action mailed Jan. 10, 2020 in related U.S. Appl. No. 16/597,014.
Non-Final Office Action mailed Dec. 6, 2019 in related U.S. Appl. No. 16/564,186.
International Search Report and Written Opinion mailed Nov. 26, 2019 in related PCT Application No. PCT/US19/51018.
International Search Report and Written Opinion mailed Feb. 11, 2020 in related PCT Application No. PCT/US2019/055323.
Final Office Action mailed Mar. 31, 2020 in related U.S. Appl. No. 15/356,436.
Non-Final Office Action mailed Mar. 3, 2020 in related U.S. Appl. No. 16/152,695.
Non-Final Office Action issued in U.S. Appl. No. 14/881,535 mailed May 20, 2020.
Non-Final Office Action issued in U.S. Appl. No. 15/145,443 mailed May 8, 2020.
Non-Final Office Action issued in U.S. Appl. No. 16/458,696 mailed May 22, 2020.
International Search Report and Written Opinion issued in PCT/US2020/023809 mailed Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel engines/duel-fuel-diesel engines (Year 2015).
Goodwin, "High-voltage auxilliary switchgear for power stations," Power Engineering Journal, 1989, 10 pg. (Year 1989).
Non-Final Office Mailed Oct. 26, 2020 in U.S. Appl. No. 15/356,436.
Non-Final Office Mailed Oct. 5, 2020 in U.S. Appl. No. 16/443,273.
Non-Final Office Action Mailed Sep. 29, 2020 in U.S. Appl. No. 16/943,727.
Non-Final Office Action Mailed Sep. 2, 2020 in U.S. Appl. No. 16/356,263.
Non-Final Office Action Mailed Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action issued Sep. 22, 2020 in Canadian Application No. 2,982,974.
International Search Report and Written Opinion Mailed Sep. 3, 2020 in PCT/US2020/36932.

"Process Burner" (https://www.cebasrt.com/productsloii-gaslprocess-bumer) 06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
Canadian Office Action issued Sep. 8, 2020 in Canadian Patent Application No. 2,928,707.
Canadian Office Action issued Aug. 31, 2020 in Canadian Patent Application No. 2,944,980.
International Search Report and Written Opinion Mailed Aug. 28, 2020 in PCT/US20/23821.
Morris et al., U.S. Appl. No. 62/526,869; Hydration-Blender Transport and Electric Power Distribution for Fracturing Operation; Jun. 28, 2018; USPTO; see entire document.
Final Office Action mailed Feb. 4, 2021 in U.S. Appl. No. 16/597,014.
International Search Report and Written Opinion mailed Feb. 4, 2021 in PCT/US20/59834.
International Search Report and Written Opinion mailed Feb. 2, 2021 in PCT/US20/58906.
International Search Report and Written Opinion mailed Feb. 3, 2021 in PCT/US20/58899.
Non-Final Office Action mailed Jan. 29, 2021 in U.S. Appl. No. 16/564,185.
Final Office Action mailed Jan. 21, 2021 in U.S. Appl. No. 16/458,696.
Final Office Action mailed Jan. 11, 2021 in U.S. Appl. No. 16/404,283.
Non-Final Office Action mailed Jan. 4, 2021 in U.S. Appl. No. 16/522,043.
International Search Report and Written Opinion mailed Dec. 14, 2020 in PCT/US2020/53980.
International Search Report and Written Opinion mailed in PCT/US20/67526 mailed May 6, 2021.
International Search Report and Written Opinion mailed in PCT/US20/67608 mailed Mar. 30, 2021.
International Search Report and Written Opinion mailed in PCT/US20/67528 mailed Mar. 19, 2021.
International Search Report and Written Opinion mailed in PCT/US20/67146 mailed Mar. 29, 2021.
International Search Report and Written Opinion mailed in PCT/US20/67523 mailed Mar. 22, 2021.
International Search Report and Written Opinion mailed in PCT/US2020/066543 mailed May 11, 2021.
U.S. Well Services, Inc. files suit against Halliburton Company and Cimarex Energy Co. for patent infringement, Apr. 15, 2021, PR Newswire, https://www.prnewswire.com/news-releases/US-well-services-inc-files-suit-against-halliburton-company-and-cimarex-energy-co-for-patent-infringement-301270118.html, 2 pages.
Services—U.S. Well Services, http://uswellservices.com/services/, accessed Nov. 13, 2021, 10 pages.
Publications, U.S. Department of Labor—Occupational Safety and Health Administration, https://web.archive.org/web/20150626140537/https://www.osha.gov/pls/publications/publication.html, 47 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
U.S. Department of Labor—Occupational Safety and Health Administration, https://web.archive.org/web/20150406152927/https://www.osha.gov/, 4 pages.
Steven C. Carlson, Weaponizing IPRs, Landslide, Sep. 22, 2019, 10 pages.
Declaration of Dr. Mark Ehsani, IPR2021-01066, Jul. 2, 2021, 213 pages.
Declaration of Robert Schaaf, IPR2021-01066, Nov. 17, 2021, 43 pages.
U.S. Pat. No. 10,020,711, 250 pages.
U.S. Appl. No. 62/323,303, 62 pages.
Amazon.com purchase page for Electrical Engineering Reference Manual for the Electrical and Computer PE Exam, Sixth Edition, https://web.archive.org/web/20070103124447/https:/www.amazon.

(56) References Cited

OTHER PUBLICATIONS com/Electrical-Engineering-Reference-Manual-Computer/dp/1888577568/, accessed Jul. 23, 2021, 7 pages.
Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.
Declaration of Robert Schaaf, IPR2021-01238, Nov. 17, 2021, 38 pages.
John A. Camera, PE, Electrical Engineering Reference Manual for the Electrical and Computer PE Exam, Sixth Edition, 2002, 102 pages.
U.S. Pat. No. 10,526,882, 845 pages.
U.S. Appl. No. 62/180,289, 32 pages.
IEEE 100 The Authoritative Dictionary of IEEE Standards Terms Seventh Edition, 2000, 7 pages.
National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review / Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Professional Publications, Inc., FE Exam, PE Exam, ARE Exam, and NCIDQ Exam Review / Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review / Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review / Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., Electrical Engineering Reference Manual, 12 pages.
Professional Publications, Inc., Books for the FE, PE, FLS and PLS Exams, Spring 2004, http://www.ppi2pass.com/corner/catalog.pdf, 16 pages.
Lionel B. Roe, Practices and Procedures of Industrial Electrical Design, 1972, McGraw-Hill, Inc., Chapter 2: The Basic Electric System, 11 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Robert Durham, IPR2021-01315, Aug. 12, 2021, 209 pages.
Declaration of Robert Schaaf, IPR2021-01315, Nov. 19, 2021, 39 pages.
Excerpt of U.S. Pat. No. 9,893,500, 106 pages.
U.S. Appl. No. 9,893,500, 291 pages.
U.S. Pat. Appln. No. 62/323, 168, 41 pages.
*U.S. Well Services, Inc. and U.S. Well Services, LLC* v *Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc.* v *Halliburton Company*, Case No. 6:21-cv-00367-ADA, accessed Dec. 17, 2021, 14 pages.
*U.S. Well Services, Inc.* v *Halliburton Company*, Case No. 6:21-cv-00367-ADA, Document 64, Order Resetting Markman Hearing, Dec. 8, 2021, 1 page.
Approved American National Standard, ANSI/NEMA MG Jan. 2011, American National Standard Motors and Generators, Dec. 9, 2021, 636 pages.
Comprehensive Power: Power it Up, Feb. 27, 2013, 28 pages.
Comprehensive Power: Power it Up, Brochure, 26 pages.
Declaration of Robert Schaaf, IPR2021-01316, Nov. 19, 2021, 33 pages.
Declaration of Robert Durham, IPR2021-01316, Aug. 13, 2021, 75 pages.
U.S. Pat. No. 10,280,724, 668 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.
U.S. Pat. No. 10,408,031, 734 pages.
Maxwell James Clerk 1868, On Governors, Proc. R. Soc. Lond., pp. 16270-16283.
Katsuhiko Ogata, Modern Control Engineering: Third Edition, 1997, 2 pages.
49 C.F.R. Part 393 (Oct. 1, 2006), 36 pages.
International Search Report and Written Opinion mailed Jun. 2, 2020 in corresponding PCT Application No. PCT/US20/23809.
International Search Report and Written Opinion mailed Jun. 23, 2020 in corresponding PCT Application No. PCT/US20/23912.
International Search Report and Written Opinion mailed Jul. 22, 2020 in corresponding PCT Application No. PCT/US20/00017.
Office Action mailed Aug. 4, 2020 in related U.S. Appl. No. 16/385,070.
Office Action mailed Jun. 29, 2020 in related U.S. Appl. No. 16/404,283.
Office Action mailed Jun. 29, 2020 in related U.S. Appl. No. 16/728,359.
Office Action mailed Jun. 22, 2020 in related U.S. Appl. No. 16/377,861.
Canadian Office Action mailed Aug. 18, 2020 in related CA Patent Application No. 2,933,444.
Canadian Office Action mailed Aug. 17, 2020 in related CA Patent Application No. 2,944,968.
Non-Final Office Action issued in U.S. Appl. No. 16/871,928 mailed Aug. 25, 2021.
Non-Final Office Action issued in U.S. Appl. No. 16/943,727 mailed Aug. 3, 2021.
Non-Final Office Action issued in U.S. Appl. No. 14/881,525 mailed Jul. 21, 2021.
Non-Final Office Action issued in U.S. Appl. No. 16/404,283 mailed Jul. 21, 2021.
Notice of Allowance and Notice of Allowability issued in U.S. Appl. No. 15/829,419 mailed Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.

(56) References Cited

OTHER PUBLICATIONS

Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules, " Sep. 6, 2019, Natural Gas Intel, https://www.naturalgasintel.com/natural-gas-finding-niche-in-e-fracking-but-diesel-still-rules, 9 pages.
Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://wwww.spglobal.com/marketintelligence/en/news-insights/latest-news-headlines/growth-in-electric- fracking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
*U.S. Well Services, Inc., and U.S. Well Services, LLC* v *Halliburton Company, Cimarex Energy Co.*, Halliburton Energy Services, Inc., and Halliburton US Techologies, Inc., Case No. WA:21-CV-00367-ADA, Document 61, Order Setting Markman Hearing, Nov. 29, 2021, 1 page.
*U.S. Well Services, Inc., and U.S. Well Services, LLC* v *Halliburton Company, Cimarex Energy Co., Halliburton Energy Services, Inc., and Halliburton US Techologies, Inc.*, Case No. WA:21-CV-00367-ADA, Document 61, Order Resetting Markman Hearing, Dec. 8, 2021, 1 page.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.
The American Heritage Dictionary of the English Language, Fifth Edition, Fiftieth Anniversary, p. 911.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
U.S. Pat. No. 10,648,311, 1,804 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.
Random House Webster's Unabridged Dictionary, Second Edition, 2001, p. 990.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
Society of Automotive Engineers, Sae J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.

"StarTech.com 1 Port RS232 Serial to IP Ethernet Converter (NETRS2321P)," StarTech, http://www.amazon.com/StarTech-com-Serial-Ethernet-Converter-NETRS2321P/dp/B00FJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethernet-Intelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
U.S. Pat. No. 10,254,732, 552 pages.
U.S. Appl. No. 62/204,331, 22 pages.
Eugene A. Avallone, Marks' Standard Handbook for Mechanical Engineers: 11th Edition, 2007, p. 16-4 and 16-22.
Moxa 802.11 Ethernet to Serial, Moxastore, http://www.moxastore.com/Moxa_802_11_Wi_Fi_Ethernet_to_Serial_s/587.html, May 24, 2016, 1 page.
Project Registration, Moxastore, http://www.moxastore.com, Feb. 15, 2015, 2 pages.
About Us, Moxastore, http://www.moxastore.com/aboutus.asp, Mar. 8, 2015, 1 page.
Nportia5250, Moxastore, http://www.moxastore.com/NPORTIA5250_p/nportia5250.htm.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YBONOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 Ags Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
Coors Tek Flowguard Products, 2012, 8 pages.
Declaration of Sylvia D. Hall-Ellis, IPR2022-00610, Feb. 28, 2022, 98 pages.
U.S. Pat. No. 10,119,381, 24 pages.
U.S. Pat. No. 10,934,824, 24 pages.
Flowline Products and Services, FMC Technologies, http://www.fmctechnologies.com, 80 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip . . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American

(56) References Cited

OTHER PUBLICATIONS

Society of Mechanical Engineers, Presented at the Energy-Sources and Technology Conference and Exhibition, Dallas, Texas, Feb. 17-21, 1985, 8 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action issued in U.S. Appl. No. 16/564,186, mailed Oct. 15, 2021.
Final Office Action issued in U.S. Appl. No. 16/356,263 mailed Oct. 7, 2021.
Non-Final Office Action issued in U.S. Appl. No. 17/060,647 mailed Sep. 20, 2021.
Non-Final Office Action issued in U.S. Appl. No. 16/901,774 mailed Sep. 14 2021.
Canadian Office Action issued in Canadian Application No. 3,094,768 mailed Oct. 28, 2021.
*U.S. Well Services, LLC v Tops Well Services, LLC and Honghua America, LLC*, Case No. 3:19-cv-00237, Document 72-9, Declaration of Dr. Robert Schaaf, Apr. 24, 2020, 52 pages.
*U.S. Well Services, LLC v Tops Well Services, LLC and Honghua America, LLC*, Case No. 3:19-cv-00237 Document 72-9, Declaration of Dr. Robert Schaaf—part 2, Apr. 24, 2020, 128 pages.
*U.S. Well Services, LLC v Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC v Tops Well Services, LLC and Honghua America, LLC*, Case No. 3:19-cv-00237, Document 72, Plaintiff's Opening Claim Construction Brief, Apr. 24, 2020, 37 pages.
*U.S. Well Services, LLC v Tops Well Services, LLC and Honghua America, LLC*, Case No. 3:19-cv-00237, Document 1, Plaintiff's Original Complaint, 63 pages.
*U.S. Well Services, LLC v Tops Well Services, LLC and Honghua America, LLC*, Case No. 3:19-cv-00237, Document 90, Plaintiff's Opposition to Defendants' Motion for Summary Judgment of Invalidity under 35 USC 112, 30 pages.
*U.S. Well Services, LLC v Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC v Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC v Signfiy North America Corp., Signify Holding B.V., and Signify N.V.*, Case No. 6:20-cv-01056-ADA, Document 24, Scheduling Order, Aug. 13, 2021, 4 pages.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
*U.S. Well Services, Inc. and U.S. Well Services, LLC v Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC v Halliburton Company and Cimarex Energy Co.*, Case No. 6:21-cv-00367-ADA, Plaintiff's Disclosure of Asserted Claims and Preliminary Infringement Contentions, Jul. 12, 2021, 9 pages.
*U.S. Well Services, Inc. and U.S. Well Services, LLC v Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC v Halliburton Company and Cimarex Energy Co.*, Case No. 6:21-cv-00367-ADA, Defendants' Preliminary Invalidity Contentions, Sep. 10, 2021, 193 pages.
*U.S. Well Services, Inc. and U.S. Well Services, LLC v Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 IEEE, Paper No. PCIC-2010-22, 10 pages.
American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph.D., Case Nos. IPR2021-01032, IPR2021-01033, and IPR2021-01034, Jun. 18, 2021, 173 pages.
Stephen Cary et al, "Electric Rotating Machine Standards Part II: Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
U.S. Pat. No. 8,789,601, 159 pages.
U.S. Pat. No. 9,410,410, 263 pages.
U.S. Pat. No. 10,337,308, 861 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release-2014/10/01/670,029/10100696/en/Game-changing-hydraulic-fracturing-technology-reduces-emissions-by-99.html, 4 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.

(56) References Cited

OTHER PUBLICATIONS

D. Bogh et al., "A User's Guide to Factory Testing of Large Motors: What Should Your Witness Expect," IEEE, accessed Jun. 10, 2021, 8 pages.
Ryan Davis, "Albright Says He'll Very Rarely Put Cases On Hold For PTAB," Law 360, https://www.law360.com/articles/1381597/print?section=ip, 2 pages.
Dani Kass, "Fintiv Fails: PTAB Uses 'Remarkably Inaccurate' Trial Dates," Nov. 2, 2021, Law 360, 1 page.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
T. W. Pascall et al., "Navigating the Test Requirements of API 541 4th Edition," 2007, IEEE, Paper No. PCIC-2007-11, 12 pages.
"Kerr Pumps & FlowVale Awards for Excellence in Well Completion, Northeast 2017—Awarded to: U.S. Well Services," https://www.oilandgasawards.com/winner/northeast-2017-kerr-pumps-flowvale-awards . . . , accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
*U.S. Well Services, Inc.* v. *Halliburton Company*, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
A. T. Dufresne, "How reliable are trial dates relied on by the PTAB in the Fintiv analysis?" Perkins Coie, 2021, 3 pages.
J. Malinowski et al., "Petrochemical Standards A Comparison Between IEEE 841-2001, API 541, and API 547," 2004, IEEE, Paper No. PCIC-2004-22, 8 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
Gardner Denver, 3 1502 Male Hammer Union Discharge Flange, 2005, 13 pages.
Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Email from Michael See on Jun. 10, 2021 regarding API-541 Fourth Edition: Public Availability, 2 pages.
Halliburton, Halliburton All-Electric Fracturing Reducing Emissions and Cost Brochure, 2021, 6 pages.
IEEE Power Engineering Society, 112 IEEE Standard Test Procedure for Polyphase Induction Motors and Generators, 2004, 87 pages.
*U.S. Well Services, LLC* v *Tops Well Services, LLC*, Case No. 3:19-cv-237, Document 135, Order, Sep. 22, 2021, 2 pages.
*U.S. Well Services, Inc. and U.S. Well Services, LLC* v *Halliburton Company and Cimarex Energy Co.*, Case No. 6:21-cv-00367-ADA, Document 56, Defendants' Opening Claim Construction Brief, Oct. 27, 2021, 46 pages.
"Screenshot of USWS Clean Fleet System Video," 1 page.
John Daniel, "8.30 DEP Industry Observations: New Flac Fleet; New Fleet Designs Forthcoming," Daniel Energy Partners, Aug. 30, 2020, 13 pages.
Declaration of Joel N. Broussard, IPR2021-01034, IPR2021-01035, IPR2021-01036, and IPR2021-01037, Oct. 20, 2021, 11 pages.
Declaration of Robert Schaaf, IPR2021-01034, Oct. 20, 2021, 47 pages.
Declaration of Dr. Mark Ehsani, IPR2021-01035, Jun. 18, 2021, 188 pages.
U.S. Pat. No. 9,970,278, 310 pages.
Stan Gibilisco, The Illustrated Dictionary of Electronics: Audio/Video Consumer Electronics Wireless Technology—Eighth Edition, 2001, p. 667.
Declaration of Robert Schaaf, IPR2021-01035, Oct. 20, 2021, 51 pages.
Declaration of Dr. L. Brun Hilbert, P.E., IPR2021-01037 and IPR2021-01038, Jun. 21, 2021, 124 pages.
U.S. Pat. No. 9,745,840, 215 pages.
U.S. Pat. No. 10,408,030, 401 pages.
U.S. Appl. No. 62/242,173, 17 pages.
Declaration of Robert Schaaf, IPR2021-01037, Oct. 20, 2021, 52 pages.
Zeus Electric Pumping Unit, Halliburton, http://www.halliburton.com/en/products/zeus-electric-pumping-unit, 2021, 4 pages.
Declaration of Joel N. Broussard, IPR2021-01038, Oct. 20, 2021, 11 pages.
*LedComm LLC* v *Signify North America Corporation*, Case No. 6:20-cv-01056-ADA, accessed Dec. 3, 2021, 11 pages.
*U.S. Well Services, Inc.* v *Halliburton Company*, Case No. 6:21-cv-00367-ADA, accessed Dec. 13, 2021, 14 pages.
Declaration of Robert Schaaf, IPR2021-01038, Nov. 10, 2021, 40 pages.
*Transcend Shipping Systems LLC* v *Mediterranean Shipping Company S.A.*, Case No. 6:21-cv-00040, Document 27, Order of Dismissal with Prejudice, Dec. 7, 2021, 1 page.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
America Invents Act, H.R. Rep. No. 112-98, Jun. 1, 2011, 165 pages.
Declaration of Joel N. Broussard, IPR2021-01065, Oct. 20, 2021, 11 pages.
Declaration of Dr. Robert Durham, IPR2021-01065, Jun. 18, 2021, 138 pages.
Declaration of Robert Schaaf, IPR2021-01065, Nov. 10, 2021, 33 pages.
U.S. Pat. No. 9,410,410, Excerpt—Response to Non-Final Office Action filed Feb. 3, 2016, 57 pages.
U.S. Pat. No. 9,840,901, 216 pages.
U.S. Appl. No. 62/242,566, 34 pages.
Industrial Safety & Hygiene News, OSHA issues hazard alert for fracking and drilling, Jan. 6, 2015, 1 page.
Portfolio Media Inc., A Shift to Sand: Spotlight on Silica Use in Fracking, Law360, https://www.law360.com/articles/366057/print?section=energy, accessed Jun. 10, 2021, 5 pages.
Henry Chajet, "OSHA Issues Alert on Non-Silica Fracking Hazards," Jan. 30, 2015, National Law Review Newsroom, 2 pages.
*U.S. Well Services, LLC*, v *Voltagrid LLC, Nathan Ough, Certarus (USA) Ltd., and Jared Oehring*, Case No. 4:21-cv-3441-LHR, Document 13, Plaintiff U.S. Well Services, LLC's Motion for Preliminary Injunction and Request for Hearing, Nov. 4, 2021, 311 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
Occupational Safety and Health Administration—Home, United States Department of Labor, https://web.archive.org/web/20120722160756/http://www.osha.gov/, accessed Jun. 13, 2021, 2 pages.

(56) References Cited

OTHER PUBLICATIONS

Industry/Hazard Alerts, United States Department of Labor, https://web.archive.org/web/20120801064838/http://www.osha.gov:80/hazardindex.html, accessed Jun. 13, 2021, 1 page.
Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.
A. Abbott, Crippling the Innovation Economy: Regulatory Overreach at the Patent Office, Regulatory Transparency Project, Aug. 14, 2017, 35 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.
Testimony of Judge Paul R. Michel (Ret.) United States Court of Appeals for the Federal Circuit Before the Subcommittee on Intellectual Property, U.S. Senate Committee on the Judiciary, Jun. 4, 2019, 8 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Mike Soraghan, OSHA issues hazard alert for fracking and drilling, E&E, Dec. 10, 2014, 1 page.

\* cited by examiner

SYSTEM FOR GAS COMPRESSION ON ELECTRIC HYDRAULIC FRACTURING FLEETS

CROSS REFERENCE TO RELATED APPLICATIONS

This application is a divisional of U.S. patent application Ser. No. 15/356,436, filed Nov. 18, 2016, titled "SYSTEM FOR GAS COMPRESSION ON ELECTRIC HYDRAULIC FRACTURING FLEETS," which claims priority to U.S. Provisional Patent Application Ser. No. 62/258,055, filed Nov. 20, 2015, the full disclosures of which are hereby incorporated by reference herein for all purposes.

BACKGROUND OF THE INVENTION

1. Field of Invention

The present disclosure relates to operations in a subterranean formation. In particular, the present disclosure relates to a hydraulic fracturing system.

2. Description of Related Art

Hydraulic fracturing is a technique used to stimulate production from some hydrocarbon producing wells. The technique usually involves injecting fluid into a wellbore at a pressure sufficient to generate fissures in the formation surrounding the wellbore. Typically, the pressurized fluid is injected into a portion of the wellbore that is pressure isolated from the remaining length of the wellbore so that fracturing is limited to a designated portion of the formation. The fracturing fluid slurry, whose primary component is usually water, includes proppant (such as sand or ceramic) that migrate into the fractures with the fracturing fluid slurry and remain to prop open the fractures after pressure is no longer applied to the wellbore. Other than water, potential primary fluids for the slurry include nitrogen, carbon dioxide, foam (nitrogen and water), diesel, or other fluids. The fracturing slurry may also contain a small component of chemical additives, which can include scale build up inhibitors, friction reducing agents, viscosifiers, stabilizers, pH buffers, acids, biocides, and other fluid treatments. In embodiments, the chemical additives comprise less than 1% of the fracturing slurry.

Powering hydraulic fracturing equipment is typically done with diesel engines. These and other internal combustion engines create safety issues, such as fire hazards, and produce pollution, including both noise and environmental pollution. Thus, there is a need for systems and methods of powering electric generators for use with hydraulic fracturing equipment.

SUMMARY OF THE INVENTION

The aforementioned problems and others are solved with the disclosed systems and methods to provide electric power to hydraulic fracturing equipment using natural gas turbine generators fueled by natural gas from the supply line of a fracturing line. In embodiments, systems can include a valve to control the release of a natural gas stream from a main gas line into a turbine gas line. The valve can include an open and closed position, or a number of intermediary positions. When the valve is closed, natural gas continues through the main supply line. When it is open, or partially open, natural gas enters the turbine gas line. The turbine gas line supplies natural gas to the natural gas turbine generators after various stages of processing.

For example, a sand trap can remove sand and other particulates from the natural gas stream, and a separator can remove water and other liquids from the natural gas stream. The natural gas stream can be directed to one or more compressors. It may be the case that gas leaves the main supply line and enters the turbine gas line at pressures that would cause damage to the compressors. A regulator in the turbine gas line can effect a pressure drop to bring the pressure of the natural gas to a pressure range that is optimum for the compressors. The optimum pressure range can be determined and set based on the specifications of the compressors and other equipment used, environmental conditions, and other factors.

In embodiments, a pressure regulator skid is used to decrease the pressure of the natural gas before it enters the compressors. The pressure regulator skid can include a system of internal valves and regulators. For instance, the pressure regulator skid can include multiple branches through which natural gas can flow. In embodiments, the pressure regulator skid includes three branches. Each branch can include an initial valve to permit or deny the flow of natural gas through that branch. Each branch can then include its own regulator downstream from the valves to independently adjust the pressure of the natural gas stream in that branch. In embodiments, additional valves can be included in one or more of the branches downstream from the regulators. Thus, individual branches can be sealed off in the event of a leak in that branch without entirely shutting down the flow of natural gas.

After the pressure of the natural gas stream decreases, the natural gas stream is routed to one or more compressors. In embodiments using more than one compressor, a compressor inlet manifold can be used to ensure natural gas is distributed evenly amongst the multiple compressors. The compressor inlet manifold can accept the natural gas stream via one or more intakes and split the stream into sub-streams corresponding to each compressor. The sub-streams may not necessarily have exactly the same volumetric flow rates or mass flow rates, but the natural gas stream will be distributed so that each compressor receives approximately the same intake of natural gas. The compressors then increase the pressure of the natural gas in their respective sub-streams.

A compressor outlet manifold can merge the sub-streams in appropriate cases. For example, a number of natural gas turbine generators will be positioned downstream from the compressors. If a compressor sub-stream were aligned one-to-one with a natural gas turbine generator, then failure of that compressor would lead to an unutilized, though otherwise operational, turbine generator. Instead, the compressor outlet manifold accepts all sub-streams from the compressor. Then, the merged stream can be directed, for example, to a second sand trap or separator. In embodiments, the stream can be divided again for an appropriate number of turbine generators. For example, two sub-streams for two compressors can be divided into four sub-streams for four turbine generators. If one compressor fails, its associated sub-stream will terminate, but the other sub-stream can still be divided amongst the four turbine generators.

In embodiments, gas discharged from the compressors can be routed to one or more filtration units. A filtration inlet manifold can similarly accept a merged stream from the compressor outlet manifold and divide the merged stream to multiple filtration units downstream from the compressors. The filtration units can remove additional particulates and liquids from the natural gas stream. Each filtration unit can have downstream from it a natural gas turbine generator, which combusts natural gas from the natural gas stream to generate electric power for electric hydraulic fracturing equipment. For example, the electric power can power an electric motor, which drives a pump that pumps hydraulic fracturing fluid into a well formation.

In embodiments, the compressors are mobile. For instance, they can be disposed on compressor trailers that can be brought to and removed from a fracturing site. The compressor trailers can carry additional equipment as well. For example, the compressor trailers can carry their own regulators to decrease the pressure of natural gas entering the compressors. Likewise, one or more additional sand traps and separators can respectively remove particulates and liquids from the natural gas streams entering the compressors. Such equipment can also operate on the exit streams from the compressors. That is, the trailers can include, for example, a separator downstream from the compressors that remove liquids from the compressor discharge streams.

In embodiments, a heating element can be included, either on the compressor trailers or elsewhere in the process. The heating element can supply heat to the natural gas stream to prevent the natural gas stream from condensing. In embodiments, the filtration units downstream from the compressors and upstream from the natural gas turbine generators act as heating elements as well, supplying heat to the natural gas stream before the stream reaches the turbine generators.

In an embodiment system, a natural gas source can provide a natural gas stream to a turbine gas line. The natural gas source can be a natural gas supply line of a hydraulic fracturing site. As described above, a valve can selectively permit natural gas to enter a turbine gas line from the natural gas supply line, or main supply line. In embodiments, the natural gas source is a fuel storage vessel. One or more fuel transport vehicles can deliver natural gas, including for instance liquefied natural gas, to a hydraulic fracturing site. A fuel transfer manifold can route the natural gas to the fuel storage vessel. From there, a fuel storage valve, when in the open position, can permit natural gas from the fuel storage vessel to enter the turbine gas line.

As noted, in embodiments, liquefied natural gas can be supplied from the natural gas source. A vaporization skid downstream from the natural gas source in the turbine gas line can vaporize the liquefied natural gas, thus converting it to a gaseous state suitable for processing by the one or more compressors. Thus, the compressors downstream from the vaporization skid will receive a gas, rather than a liquid. As discussed above, embodiments can include heating elements to supply heat to the natural gas stream. The heat can prevent the natural gas stream from condensing back into liquid. Or, in case liquefied natural gas is not the input, the heat prevents liquid from forming in the first instance.

Regardless of the input state of the natural gas, it will reach a natural gas compressor in a gaseous state. The natural gas compressor is configured to receive the gas at a first pressure and discharge the gas at a second, higher pressure. A pressure regulator skid and other equipment upstream from the natural gas compressor can ensure that the first pressure—the pressure of the natural gas stream when it enters the compressor—is within an optimum range for operation of the natural gas compressor. The compressor can then increase the pressure of the gas to put the pressure of the gas stream in an optimum range for operation of a natural gas turbine generator downstream.

A filtration unit downstream from the natural gas compressor can remove particulates, liquids, or both from the natural gas stream to provide an additional filtering step before the natural gas stream reaches a natural gas turbine generator. The turbine generator can then combust the natural gas stream to generate electricity. In embodiments, the produced electricity powers an electric motor, which drives hydraulic fracturing equipment, such as a pump.

Methods according to various embodiments can include releasing a natural gas stream from a main gas line to a turbine gas line. The turbine gas line can include equipment to process the natural gas stream and route the natural gas stream to one or more natural gas turbine generators. Embodiments further include reducing the pressure of the natural gas stream so that the pressure is within an optimum range for use in a natural gas compressor.

The natural gas stream can then be compressed in a natural gas compressor so that the natural gas stream pressure is within an optimum pressure range for use by the one or more natural gas turbine generators. The natural gas stream can then be combusted in the one or more natural gas turbine generators to generate electric power, which is then provided to an electric motor to power hydraulic fracturing equipment.

Example embodiments further include removing particulates and liquids from the natural gas stream. These steps can occur upstream from compressors, downstream from compressors, or both. Likewise, the natural gas stream can be heated at various stages of the process to prevent the natural gas stream from condensing. If the gas stream does condense, separators can be used to remove liquids. In certain embodiments, liquefied natural gas is used as an input to the process. A vaporization skid can be used to vaporized the liquefied natural gas stream upstream from the natural gas compressor(s) so that the natural gas compressor(s) receive natural gas in a gaseous state.

BRIEF DESCRIPTION OF DRAWINGS

Some of the features and benefits of the present invention having been stated, others will become apparent as the description proceeds when taken in conjunction with the accompanying drawings, in which.

Figure 1:
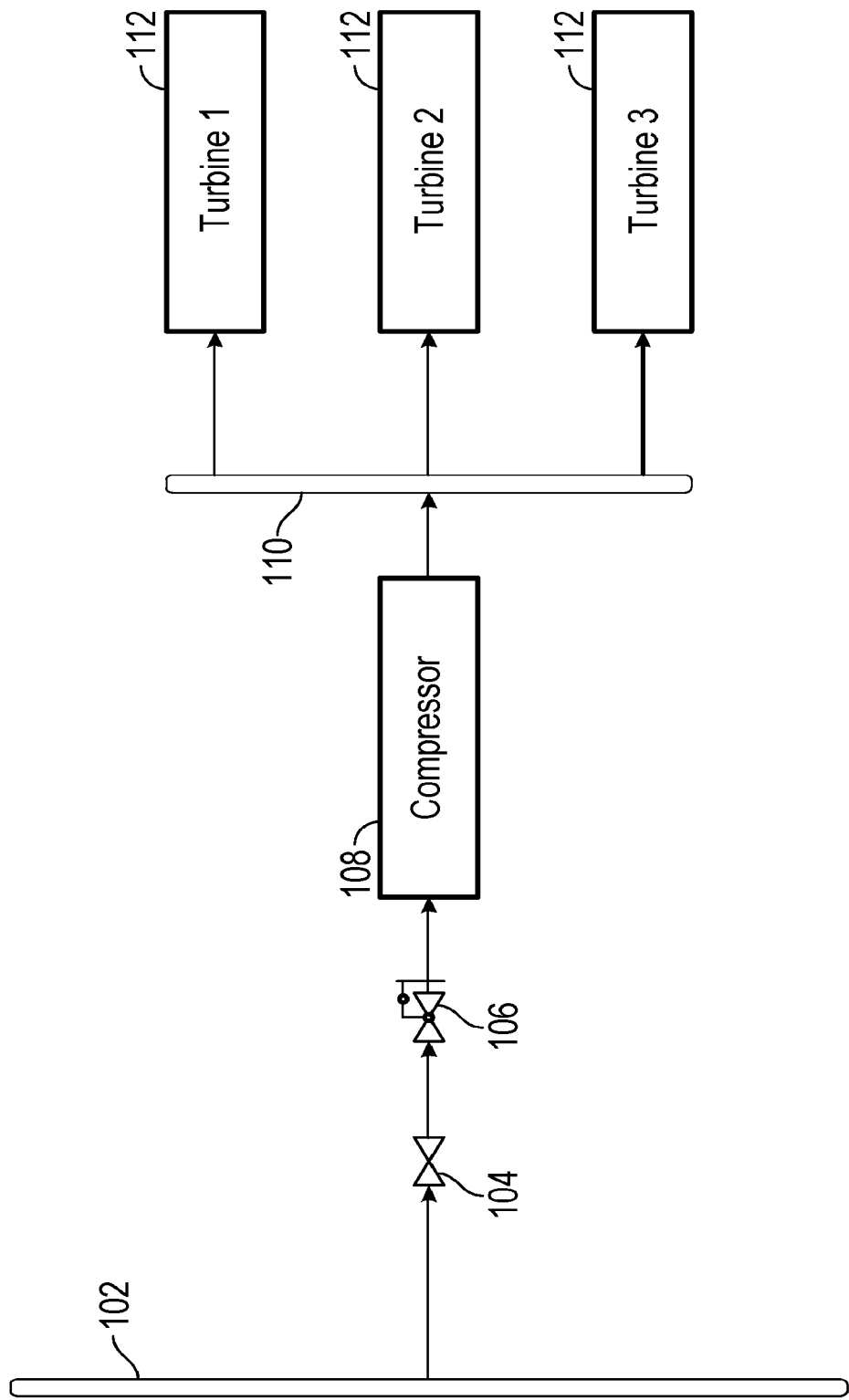
FIG. 1 is a schematic of an example of a gas compression system according to various embodiments.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein are embodiments of systems and methods that allow turbine generators to utilize field gas (natural gas from a wellhead) as a fuel source. Most well sites have a natural gas line, sometimes called a sales line, main line, or main gas supply line. In embodiments, natural gas from the sales line is accepted by one or more mobile compressors. From the compressors, the natural gas, at an elevated pressure post-compression, is fed to one or more natural gas turbine generators to provide electricity to a fleet of electric hydraulic fracturing pumps ("Clean Fleet"). The turbine generators require a fuel source to create three phase electrical power. Field gas from the sales line provides such a fuel source. Field gas is processed prior to use by the turbines. In embodiments, gas from the sales line is treated offsite as part of its preparation for sale to residential and consumer markets. However, processing can occur at various stages before gas is used by the turbines. Processing includes compressing the natural gas input to a pressure and flow rate suited for use by the turbine(s). Compressors for pressurizing the gas upstream of the turbine generators can be powered by electricity or internal combustion engines. The gas can also be further conditioned by coarse and fine particulate filters, condensate filters, or water separators. Once the turbines are running properly, they are essentially a small power plant and it is more economical, cleaner, and quieter to run as much equipment as possible from this electricity.

A black start generator ("BSG") can be used to initially power the compressors and the electronic equipment rooms ("EER") before the turbines are used for electricity. Each turbine can have its own EER, which will include breakers, fire suppression, instrumentation, and controls for the turbine engine and generator. The BSG can be powered by diesel, natural gas, or other hydrocarbon based combustible fuel. Before the turbines are running and producing electricity, this generator can be used to provide power to the compressors so they can provide natural gas to the turbines. Once the turbines are started and running steadily the compressors can be powered by the turbines, and the black start generator may no longer be needed, thus making the process completely independent of diesel fuel and self-sustaining from a power generation perspective. Also included in the present disclosure is the use of a make-before-break uninterrupted power transfer switch to seamlessly switch the power supply from black start power to turbine power once the turbines are running properly and producing electricity. The power supply transfer is initiated when the three phases are synchronized, which avoids severe damage to the equipment. The switch is also HOA (hand-off-auto) allowing seamless switching of the power supply for the compressors from the black start generator to the turbine generator. An HOA allows changing from black start power to turbine power after the turbines are running properly and producing electricity. In an example, the HOA does not interrupt the power supply and will not cause the compressors to shut down. That is, the compressors seamlessly switch power sources. After the compressors are being powered by the turbines only, the black start generator is no longer needed and can be shut down. The three modes of this switch are 1) hand, where the transfer and sync occurs manually; 2) off, where no transfer occurs; and 3) auto, where the transfer and sync occurs automatically.

In an example where electrically powered compressors are used, the compressor's onboard power voltage is the same as the voltage used for the compressor motor starter. An example compressor design employs 480V three phase power for the electric motor, and for the onboard electronics and small motors. Other embodiments could include other voltages such as 600 V. The same voltage for compressor power can be used as is used on the turbine Motor Control Center (480V). Other embodiments could include using other voltages such as 600 V, or pulling the 600V from the transformers supplying 600V power to the oilfield equipment.

Optionally, PLCs (programmable logic controllers) and/or RIOs (real-time input/output controllers) can be used to monitor, record, and control the sensor information and processes of the compression units. These controllers help automate the gas compression system while relaying critical information to operators via an HMI (human machine interface) screen on the compression units, in a data van, or in the turbines. The information can be relayed using Ethernet communications. As further elaborated below, example networks utilize Ethernet switches placed on key equipment throughout the fleet to create a robust network.

In an embodiment, controls are provided, such as in the data van (control center of the entire frac site), so that a shutdown command can be initiated for deactivating the compressors. In conjunction with the shutdown command, flaps can optionally be engaged to block a feed of ambient air to one or more of the internal combustion engines that drive the compressors. Without an oxygen source the engines cannot operate, and failure of the engines turn deactivates the compressors. By blocking ambient air, the flaps provide an added safety measure because during a natural gas leak cold compression engines could continue to operate even after an ignition switch is closed or if fuel is no longer supplied to the engine. If the ambient air has a high enough content of natural gas to support combustion, the motor can potentially still run even if the resident fuel supply is stopped. Closable intake air flaps are employed to ensure that the engine shuts down in any emergency. For electric powered compressors, the system disconnects the electrical power, instantly shutting down the compressors.

The circuit breakers on the switchgear can open also ensuring that electrical power is not supplied to the working oilfield equipment. The fire suppression system in the compression units can include its own dedicated 120V power supply. This ensures that even in the event of a power loss from the turbines, which is likely in the event of a fire, there will still be power to the compressors for the fire suppression system only.

In the event of a fire in any turbine, the compressors which are providing fuel can automatically shut down to help suppress and control the fire and prevent the fire from spreading. Inlet and outlet valves will also be automatically closed to isolate the main gas line from the gas compression and power generation equipment. The signal can instantly cut power to the electric motor which will stop the flow of gas to the turbines shutting them down. An enclosed housing on the compression unit mitigates noise from the engine, compressor, and associated machinery. The housing also allows the use of a fire suppression system. With an enclosed environment, any fire can be automatically detected enabling the fire suppression system to replace all of the oxygen within the enclosure with a fire suppressant. The final filtration and heating units can also vent all gas trapped in the lines to atmosphere to prevent the gas lines, filters, manifolds, and separators from being fire and explosion hazards. This venting further ensures that the turbines shut down faster and that the gas lines to not add fuel to any ground level fire. In embodiments, the outlet for this emergency purge is located above the bottom of the filtration units, (e.g. about eight feet above), which is often set on the deck of a trailer. The location of the outlet here helps prevent vented gas from adding to any fire.

Noise insulation can be included on the enclosed housing on the compression units to mitigate noise. Composite noise insulation (different types of noise insulation) can be included on the compression units to mitigate noise of various frequency bands. An inner reflective noise insulation can be used to reflect noise from the compressors. The use of an outer absorbent noise insulation can absorb noise that passes through the reflective layer of insulation on the fuel compressors. In an example, a suction fan is included with the fan exhaust pointed up to help mitigate noise from the cooling package fan. An enclosure air inlet and outlet on the gas compression can provide further noise mitigation, by providing both insulation and a non-straight path for any noise produced.

One or more final filtration units can heat gas, e.g. 50 degrees over the gas dew point, can prevent dropout before the gaseous fuel hits the turbine blades. Heat trace can also be used on the fuel lines. Insulation and heat trace can be applied to the drain lines to prevent freezing during cold weather operations; and insulation and/or heating can be added to pressure regulation valves to prevent freezing during cold weather operations. In certain multiple compressor embodiments, the use of a common separator and/or manifold can ensure that all compressors can feed gas to all turbines on site.

Electric gas compression units can operate on 480V of three phase power. The requisite voltage can be supplied by the electronic equipment room (EER) once the turbine is running. In embodiments, the motor starter is external and each compressor can supply over 2,000 Mcf per day at maximum capacity. In embodiment electric fracturing fleets, compression units use natural gas fueled internal combustion engines to power the compressors to provide natural gas to the filtration skids and in turn to the turbines. These do not require a black start generator as they are not electrically driven.

In embodiments, gas can be transmitted using flexible four inch diameter steel braided hoses. In embodiments, gas can be transmitted via as 2" steel braided flexible hoses, 2" hardlines, and 4" hardlines. Installing flexible lines saves time during rig in, and reduces the probability of leaks that could occur from hammer union style pipe and from angled or swiveling pipe. The flexible lines are also easier to route, and provide more line routing options. The drain lines can also be flexible, e.g. 2" diameter, steel braided hose. The drain lines can also be insulated and heat traced to avoid having the liquid freeze during the winter. Pressurized gas from the compressors (or elsewhere) can be used to clear the drain lines.

In addition, pressure regulators can be insulated and/or heat traced to avoid freezing during winter application. In embodiments, entire lines can be insulated. Glycol heaters can also be used to prevent lines from freezing. Furthermore, methanol or other compounds can be injected into the lines during freezing conditions to help thaw the system. In embodiments, multiple sets of pressure regulators can be used to drop the pressure in multiple steps to help prevent valves from freezing.

Sand traps, three phase separators, and final filtration units typically collect water, condensate, and solid particulates. In order to clear these unwanted contaminants from the system, a drain line is connected. This drain line allows for open collection reservoirs on the various filtering vessels, and allows for the dump of the contaminates into the drain line. The drain line can then be pressurized by the natural gas line so that the contaminates are blown back to the well owner through the well owner's drain line for larger natural gas distribution and compression system. This system allows for nonstop operating of filtering vessels and prevents any flammable liquids or gases from being exposed at the well site. In embodiments, the diameter of the drain line size is 2". This line returns unwanted liquids to the well owner. High pressure, such as 350 psi, is used to pressurize the holding vessels on the filtration units, and the liquids are then purged back to the main line to be captured by associated processing equipment. If sales quality gas is used, there will typically be very little liquid returned. Alternatively, unwanted liquids and particulates can be drained into plastic totes instead of using a drain line. The plastic totes can then be disposed when full. One advantage of using drain lines instead of totes is to avoid storing flammable liquids onsite.

A number of example schematic diagrams are provided illustrating potential arrangements of compressors, turbines, and associated components for systems and methods to supply natural gas from a sales line to natural gas turbines for powering an electric hydraulic fracturing fleet.

FIG. 1 is an example of a gas compression system. In an example, the system accepts natural gas from a main supply line 102, which can be a sales line or a producing well. A valve 104 selectively permits the entry of natural gas from the main supply line 102 to the compressor and turbine system. Various types of valves can be used. The valve 104 can have an open position allowing the flow of natural gas and a closed position preventing the flow of natural gas. In embodiments, intermediary positions for the valve 104 can be provided as well. For example, the valve 104 can be partially opened along discrete positions or a spectrum of positions between the open and closed positions. A regulator 106 controls pressure in the natural gas line. This ensures that the gas pressure remains below a value that could damage plumbing, valves, or the compressor. The regulator 106 also helps dampen pressure surges in the gas flow which could be amplified after being pressurized by the compressor 108, and that could damage or shutdown the turbines 112.

Gas leaving the main supply line 102 typically has a pressure of between 60 psi and 180 psi, though the pressure can be higher, such as 400 psi. At very high pressures, such as 3000 psi, a regulator may be installed in the main supply line itself to effect a pressure drop before gas leaves the line. In an embodiment, the regulator 106 maintains pressure to the compressor inlet at around 100 psi. Thus, the regulator 106 can effect a pressure drop if the incoming gas pressure is greater than 100 psi. The maintenance pressure can be selected based on ground conditions, and the regulator 106 can be configured to maintain pressure at that level. Downstream from the regulator 106, gas is fed to a compressor 108. The compressor 108 compresses the gas it receives, thus increasing the pressure of the gas in the line. At the compressor discharge, gas pressure can be elevated up to around 300 psi; however, in embodiments, the turbines safely handle fuel at a pressure of 150 psi to 380 psi. As with the regulator 106, the compressor 108 can be configured to discharge gas at a desired pressure or range of pressures, based on the conditions on the ground and/or the natural gas turbine generators 112 being used. In embodiments, the compressor 108 is powered by electricity, which further decreases overall emissions and noise pollution and brings the entire process closer to being powered by turbine-produced electricity. In embodiments, the incoming gas pressure from the main supply line can be high enough to supply the turbines directly. However, when the turbines reach a higher load, the supply pressure decreases as extra gas volume is drawn from the line, which causes the turbines to shut down. Additionally, many supply lines are inconsistent and fluctuate between higher and lower pressure, regardless of the fuel demand of the turbines. Thus, compressors ensure a reliable stream of gas at a consistent pressure for operation of the turbines, which avoids costly well damage and downtime.

In the example embodiment of FIG. 1, multiple natural gas turbine generators 112 are used. A turbine manifold 110 can include an inlet for each compressor 108 used and an outlet for each natural gas turbine generator 112 used. The turbine manifold 110 can thus allow for the even distribution of natural gas from the compressor(s) 108 to the natural gas turbine generator(s) 112.

Figure 2:
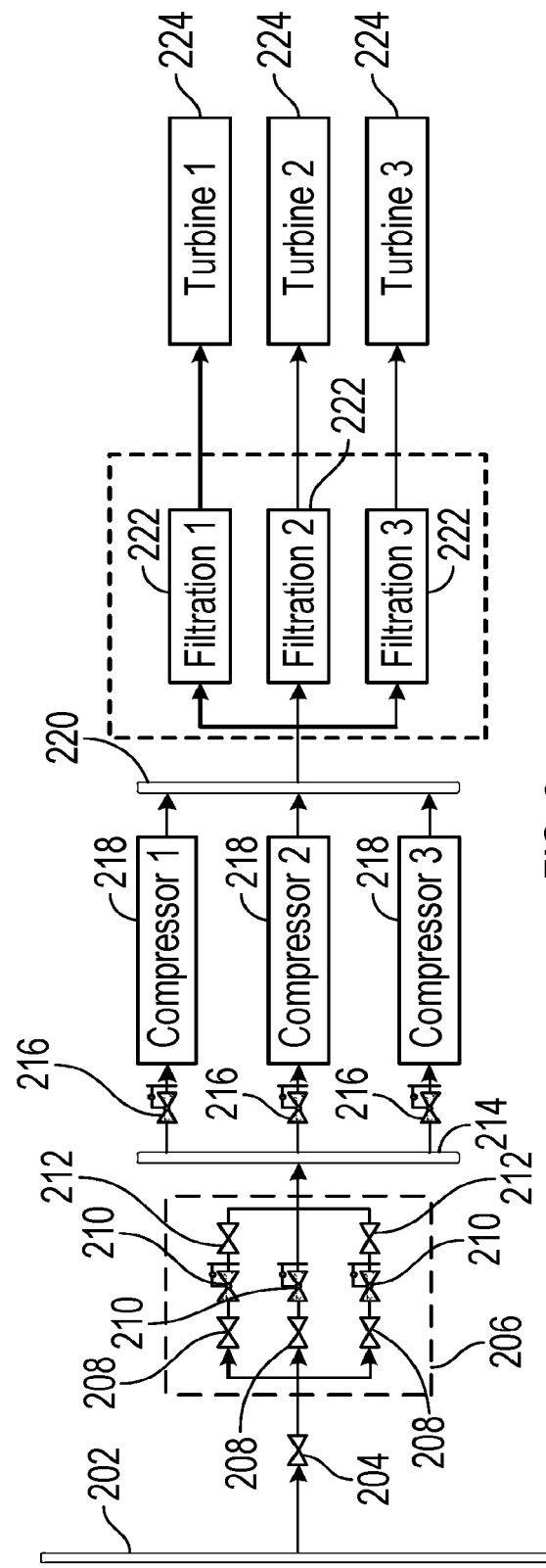
FIG. 2 is schematic of an example of a gas compression system according to various embodiments.

FIG. 2 schematically illustrates another embodiment of a gas compression system. In the illustrated embodiment, a pressure regulator skid 206 provides a system of valves and regulators to regulate the pressure of the natural gas stream before the gas reaches the compressors 218. The pressure regulator skid 206 can include one or more initial valves 208 that selectively permit the flow of natural gas through alternative gas lines within the pressure regulator skid 206. In the illustrated embodiment, each alternative gas line further includes a regulator 210 that can function as described with respect to the regulator 106 in FIG. 1. Each gas line within the pressure regulator skid 206 can include one or more additional valves 212 downstream from the internal regulators 210, which can line-by-line selectively permit the flow of natural gas exiting the pressure regulator skid 206. In the illustrated embodiment, the pressure regulator skid 206 includes a center bypass, such that the central line within the pressure regulator skid 206 does not include a valve between the regulator 210 and the outlet to the pressure regulator skid 206. This center bypass allows branches to be closed off in the event of a leak while still permitting the regulation of gas pressure and the flow of gas to allow the turbines to continue operating.

A compressor inlet manifold 214 can receive gas that exits the pressure regulator skid 206. The compressor inlet manifold 214 can evenly distribute the gas stream it receives, such that each of multiple compressors 218 receives a portion of the gas stream. Parallel regulators 216 can regulate the pressure of gas entering each respective compressor 218. Thus, the pressure of the gas stream entering each compressor 218 can be individually raised or lowered as appropriate even if the compressor inlet manifold 214 unevenly distributes gas to each compressor 218. Gas leaving the compressors 218 can exit via a compressor outlet manifold 220, which ensures that the multiple incoming streams in the illustrated embodiments are merged and directed to a series of gas filtration units 222. This manifold ensures that every natural gas turbine generator 224 receives a consistent flow of natural gas regardless of whether one or more compressors 218 fail. For example, if Compressor 1 fed natural gas directly to Turbine 1, then the failure of Compressor 1 would render Turbine 1 inoperative. Using one or more manifolds, the failure of any one compressor 218 does not prevent the natural gas turbine generators 224 from continuing to operate by receiving natural gas that passes through other compressors. Separate filtration units 222 can be provided for each natural gas turbine generator 224. The filtration units 222 can catch liquids, such as water and condensate (i.e. flammable natural gas liquids), as well as solids, such as sand.

As noted above, the compressor units 218 (Compressors 1-3) can use a natural gas fueled combustion engine to power the compressor. Other embodiments include using a diesel fueled engine, gasoline engine, dual fuel engine, or electric motor to power the compressor. An advantage of using the regulators 216 to reduce the pressure of the feed to the compressor units 218 is that a wider range of gas pressures can be accommodated. For example, the pressure regulator skid 206 can be used to achieve a first pressure drop, and the one or more regulators 216 immediately upstream from the compressors 218 can be used to achieve a second pressure drop. Moreover, regulating the gas pressure upstream of the compressors 218 protects the compressor components. In one example, gas pressure regulation is performed in two steps, which allows for separate and sequential pressure drops, which can help prevent valves from icing or reaching a critical pressure drop, thus damaging the valves.

Figure 3:
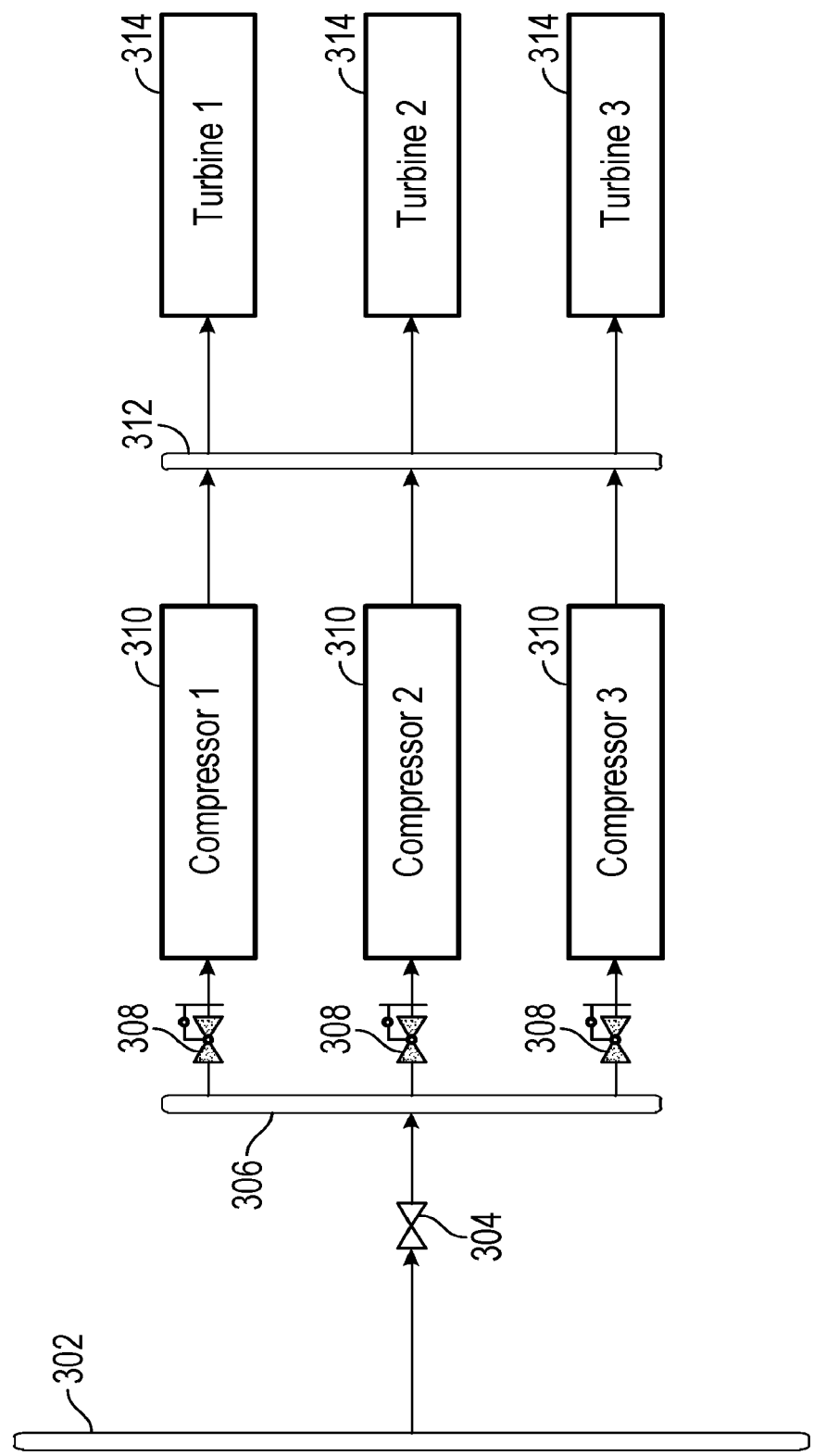
FIG. 3 is a schematic of an example of a gas compression system according to various embodiments.

FIG. 3 illustrates another schematic of a gas compression system. The system of FIG. 3 employs a valve 304 to selectively permit the flow of natural gas from the main supply line 302 to the compressor inlet manifold 306, which splits the gas line into multiple streams for each respective compressor 310. As discussed with respect to FIG. 3, multiple regulators 308 can regulate the pressure of gas entering each compressor 310. A compressor outlet manifold 310 can then route the various gas streams to one or more natural gas turbine generators 314. In the illustrated embodiment, the compressor outlet manifold 312, can include three inlets and three outlets because it is routing gas from three compressors 310 to three natural gas turbine generators 314. In embodiments, the compressor inlet manifold 306 and compressor outlet manifold 312 can include four-inch inlets and four-inch outlets and a six-inch header to evenly distribute gas volume. Filtering is not shown in this example. Such an embodiment can be used if the natural gas is pre-filtered and clean of particulates, water, and condensate.

Figure 4:
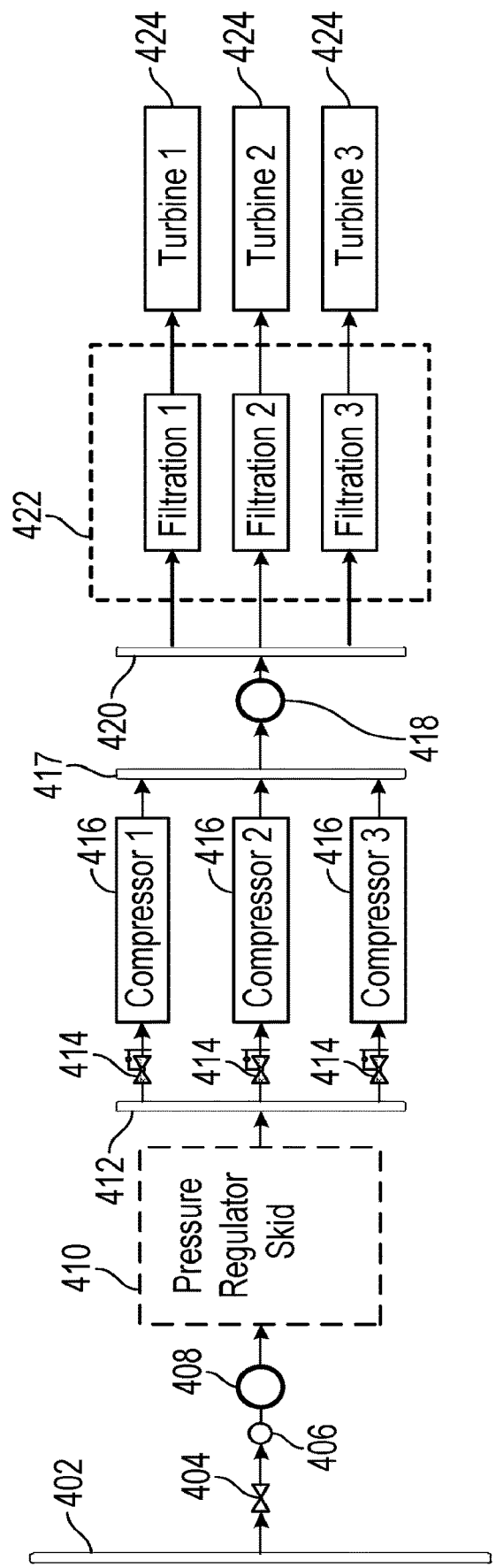
FIG. 4 is a schematic of an example of a gas compression system according to various embodiments.

FIG. 4 schematically illustrates an embodiment of a gas compression system. A valve 404 selectively permits the flow of natural gas from the main supply line 402. Downstream from the valve 404, a sand trap 406 removes sand and other particulates from the gas stream. A separator 408 downstream from the sand trap 406 separates the gas stream into three phases in order to pull out unwanted liquids. A pressure regulator skid 410 can regulate the pressure of the gas stream using a system of valves and regulators as described above with respect to other embodiments. Likewise, a system of compressors 416 can increase the pressure of the gas stream. As described above, a compressor inlet manifold 412 can split the gas stream into one or more lines, each of which can include its own regulator 414 downstream from the compressors 416, and a compressor outlet manifold 417 can merge the one or more lines. In the illustrated embodiment, the compressor outlet manifold 417 can direct the gas stream to a second three-phase separator 418, from which the gas stream can pass to a filtration inlet manifold 420. The gas stream can be directed from the filtration inlet manifold 420 to one or more filtration units 422, which can further remove particulates or liquids before the gas stream passes to the natural gas turbine generators 424. In embodiments, the filtration units 422 are trailer mounted.

Figure 5:
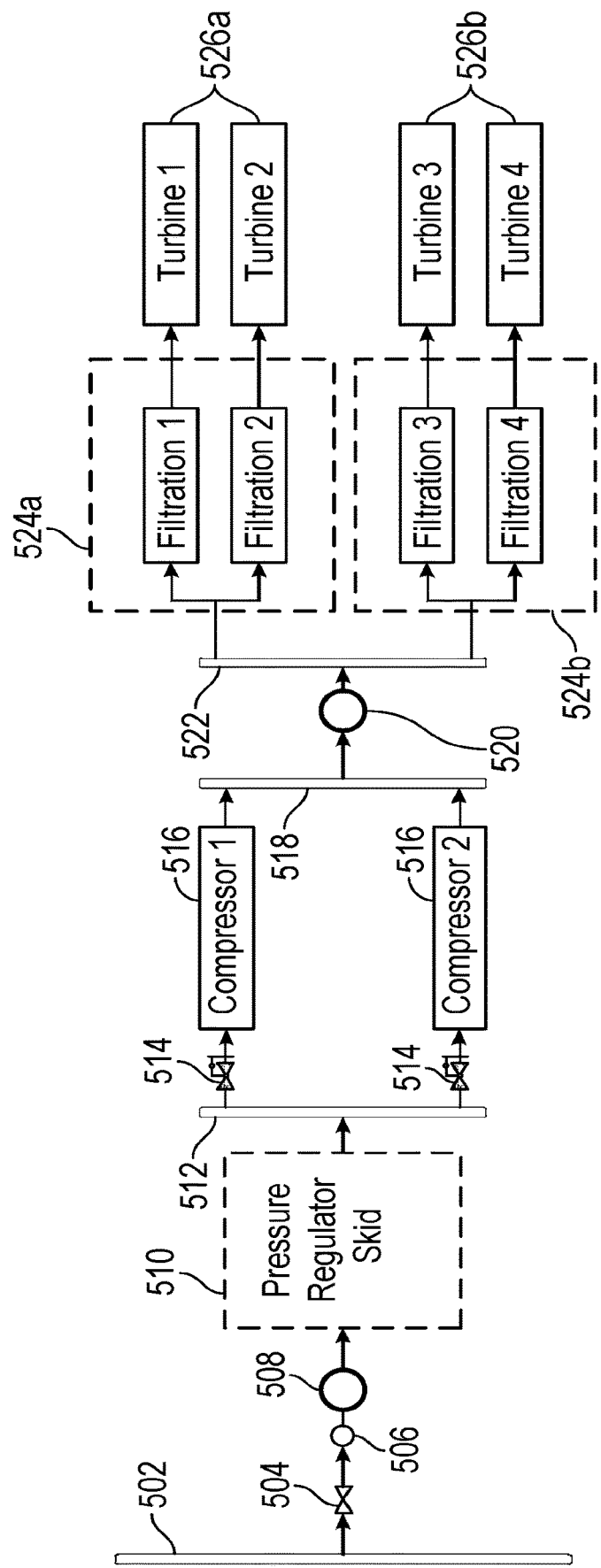
FIG. 5 is a schematic of an example of a gas compression system according to various embodiments.

FIG. 5 shows a schematic of an embodiment of a gas compression system having electric gas compressors. A valve 504 permits the flow of natural gas from the main supply line 502. In an example, electric gas compressors are larger than natural gas fueled compressors. The electric compression units can, in one embodiment, supply up to 2,000 MCF of gas per day as opposed to the smaller natural gas fueled compressors. A sand trap 506, three phase separator 508, and pressure regulator skid 510 can function as described above.

In addition, a compressor inlet manifold 512 can split the gas stream to direct gas to multiple compressors 516, each of which can include an associated regulator 514. The gas stream can be merged at a compressor outlet manifold 518, and the merged stream can be directed to a second three phase separator 520, from which the gas stream can be directed to a filtration inlet manifold 522. In the illustrated embodiment, the filtration inlet manifold 522 splits the gas stream in two, and the two streams are directed to separate gas filtration trailers 524a, 524b, each of which can have one or more filtration units. The streams from the first gas filtration trailer 524a can be directed to one or more natural gas turbine generators 526a, and the streams from the second gas filtration trailer 526b can be directed to separate natural gas turbine generators 526b.

The aforementioned black start generator can be used to power the compressors 516 before the turbines 526a, 526b are producing electricity. Gas pressure as low as 35 psi can be compressed to over 400 psi by these compressors 516. However, if pressure is that low, they may not be able to provide the required gas volume to the turbines. In an example, if pressure coming out of the compressors 516 is over 380 psi the turbines 526a, 526b will automatically shut down to prevent damage. Due to this, inlet pressure can be regulated to around 100 psi and outlet pressure can be set at around 300 psi. When the gas reaches the natural gas turbine generators 526a, 526b, the gas flows into the turbine inlets for use in a multi stage combustion chamber to rotate a three phase electric generator. These electric compression units can be a viable option wherever gas compression is required for electricity generating turbines. This is especially true on Clean Fleet hydraulic fracturing fleets where low noise and low emissions are of high importance.

An advantage of the system of FIG. 5 is that by being able to plug the compressors 516 into the power grid created by the turbine, all of the sources of combustion and emissions are in one place. This also makes for more reliable operations. Electric motors are more reliable and have a longer lifespan due to having fewer moving parts, and, because no fuel is combusted, no soot builds up to degrade the motor. Moreover, large turbines operate more efficiently with a higher load placed on them. Instead of having a small reciprocating engine for each compressor as well as the large turbines consuming fuel, the large turbines can operate at an increased efficiency.

Figure 6:
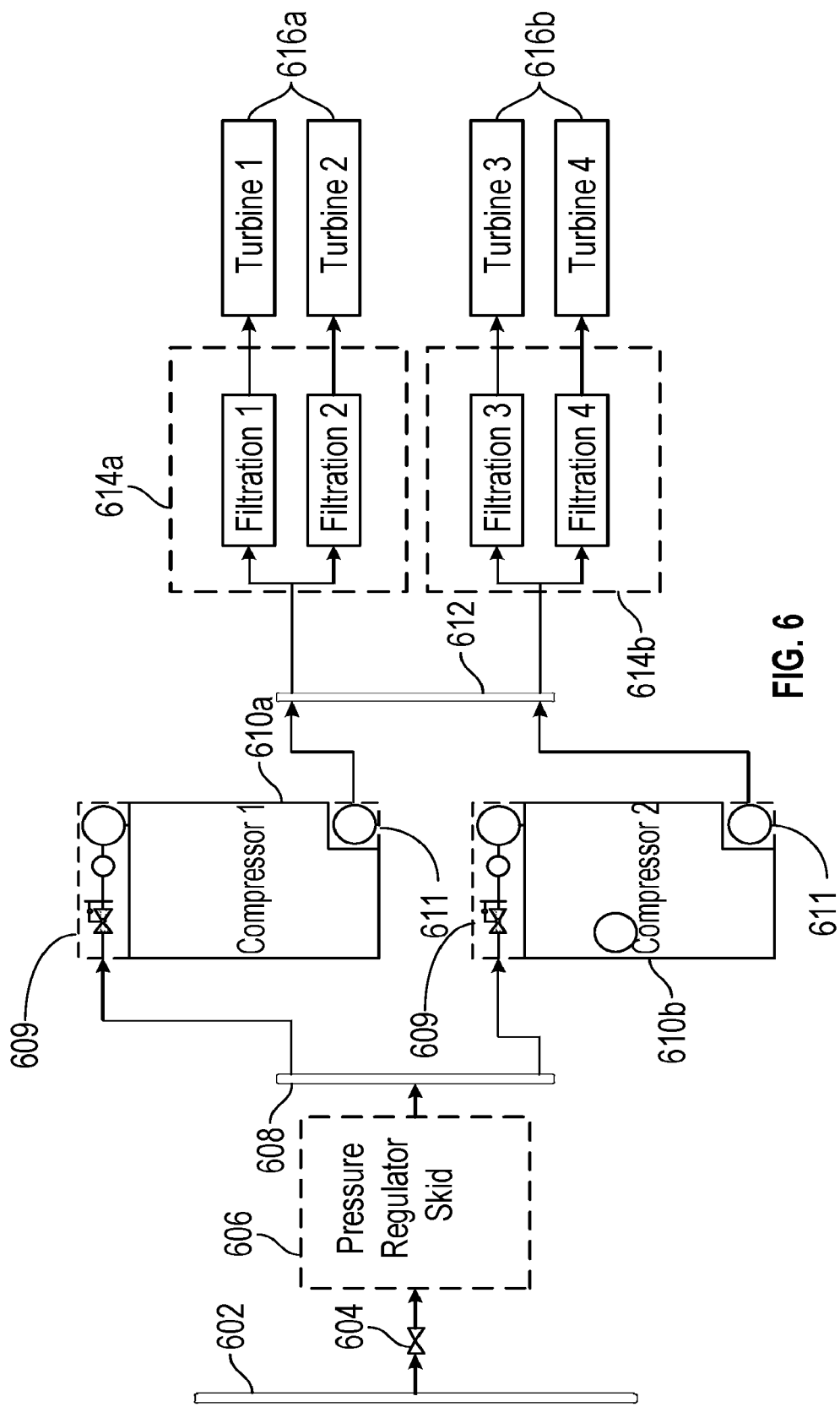
FIG. 6 is a schematic of an example of a gas compression system according to various embodiments.

FIG. 6 illustrates an embodiment of a gas compression system. As with other embodiments, a valve 604 permits the flow of natural gas from the main supply line 602. A pressure regulator skid 606 regulates the pressure of incoming gas before the gas stream reaches the compressor inlet manifold 608, at which point the gas stream can be split and directed to two separate compressors 610a, 610b. In embodiments, compressors 610a, 610b can include regulators, sand traps, and three-phase separators integrated on a single trailer to adjust the pressure of the gas stream and remove particulates and liquids before the gas stream leaves the compressors 610a, 610b. Electric compression units 610a, 610b are sometimes mounted on 48 foot long trailers, which still have unused space available. If a 53 foot long trailer is used, for example, there could be even more room available, which can be used to mount filtering equipment. For example, assemblies 609 with regulators, sand traps, and separators can be included on the same trailer. Likewise, additional separators 611 can capture further liquids from the gas stream before the stream leaves the compressors 610a, 610b. A final pressure regulator can also be external and mounted in the natural gas line leading to the compression units 610a, 610b, for example as part of assemblies 609. The gas stream can then be directed to a compressor outlet manifold 612, from which it can be passed to multiple filtration units 614a, 614b and natural gas turbine generators 616a, 616b, as described above. Four natural gas turbine generators 616a, 616b are shown, but the number of turbines can be more or less than four and depends on the HHP (hydraulic horsepower) demand of the fracturing equipment being powered. The compression units as described herein can contain three phase separators before and after compression, or just one of either. There can also be a before and/or after compression sand trap, or just one of either.

Figure 7:
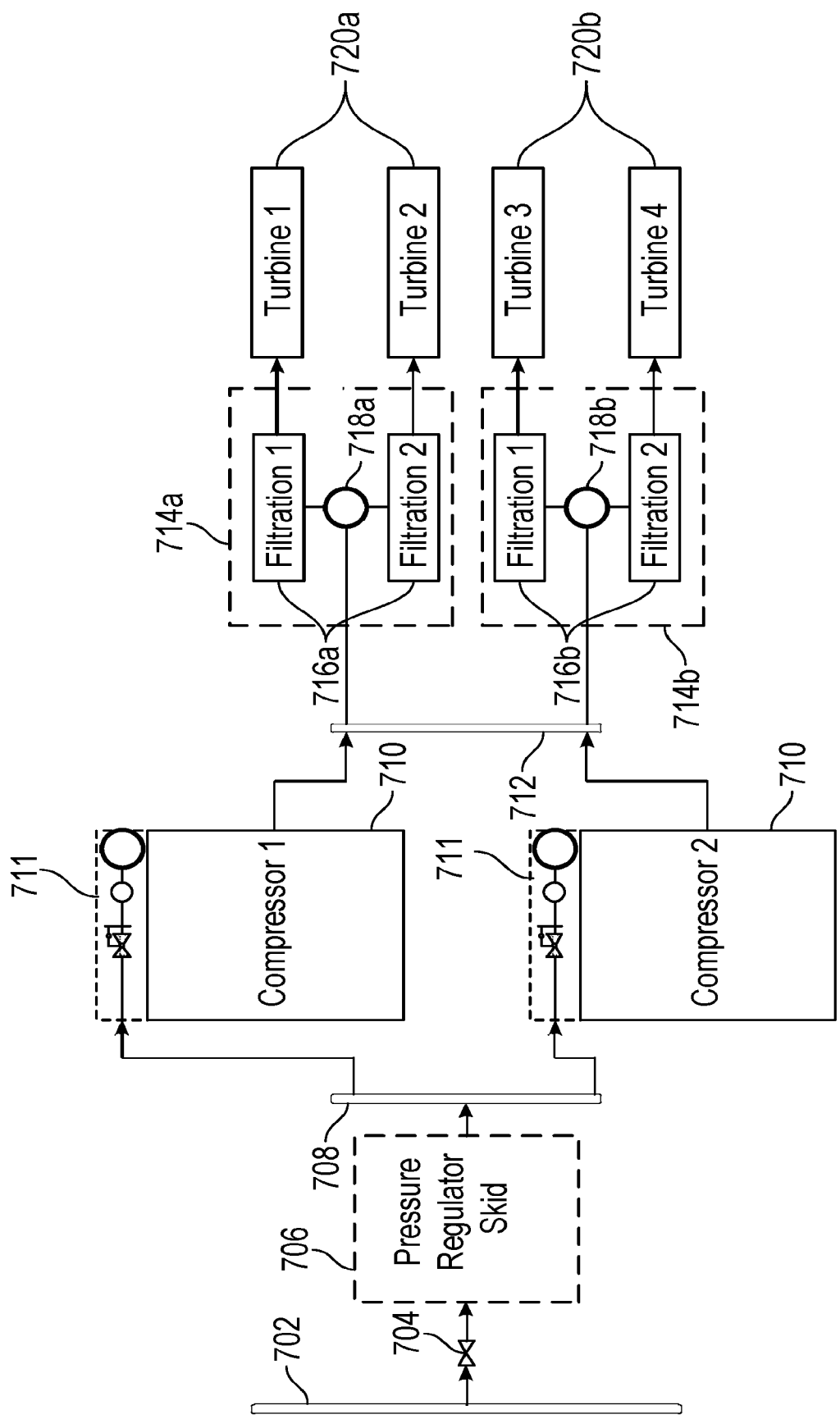
FIG. 7 is a schematic of an example of a gas compression system according to various embodiments.

FIG. 7 is a schematic embodiment of a gas compression system, which is similar to the gas compression system of FIG. 6. One difference between the embodiments of FIGS. 6 and 7 is the placement of the second three phase separator 718a, 718b. As shown in FIG. 7, instead of a large single vessel, two three phase separators 718a, 718b are provided, and where one is placed on each filtration unit trailer 714a, 714b (instead of on the trailer hosting the compressor units 710). The compressors 710 can be positioned on trailers along assemblies 711 that include regulators and smaller sand traps and separators. With smaller sand traps and separators on the compression trailers, it is also possible to have a single post-compression separator as in the other described embodiments or divided three phase separators 718a, 718b as shown. The divided three phase separators 718a, 718b can each be associated with separate filtration unit trailers 714a, 714b, each of which houses associated filtration units 716a, 716b, which pass gas streams to separate groups of natural gas turbine generators 720a, 720b. The example embodiment of FIG. 7 can also include similar components to other embodiments, such as a valve 704 permitting natural gas to flow from a main supply line 702, a pressure regulator skid 706, a compressor inlet manifold 708, compressors 710, and a compressor outlet manifold 712.

Figure 8:
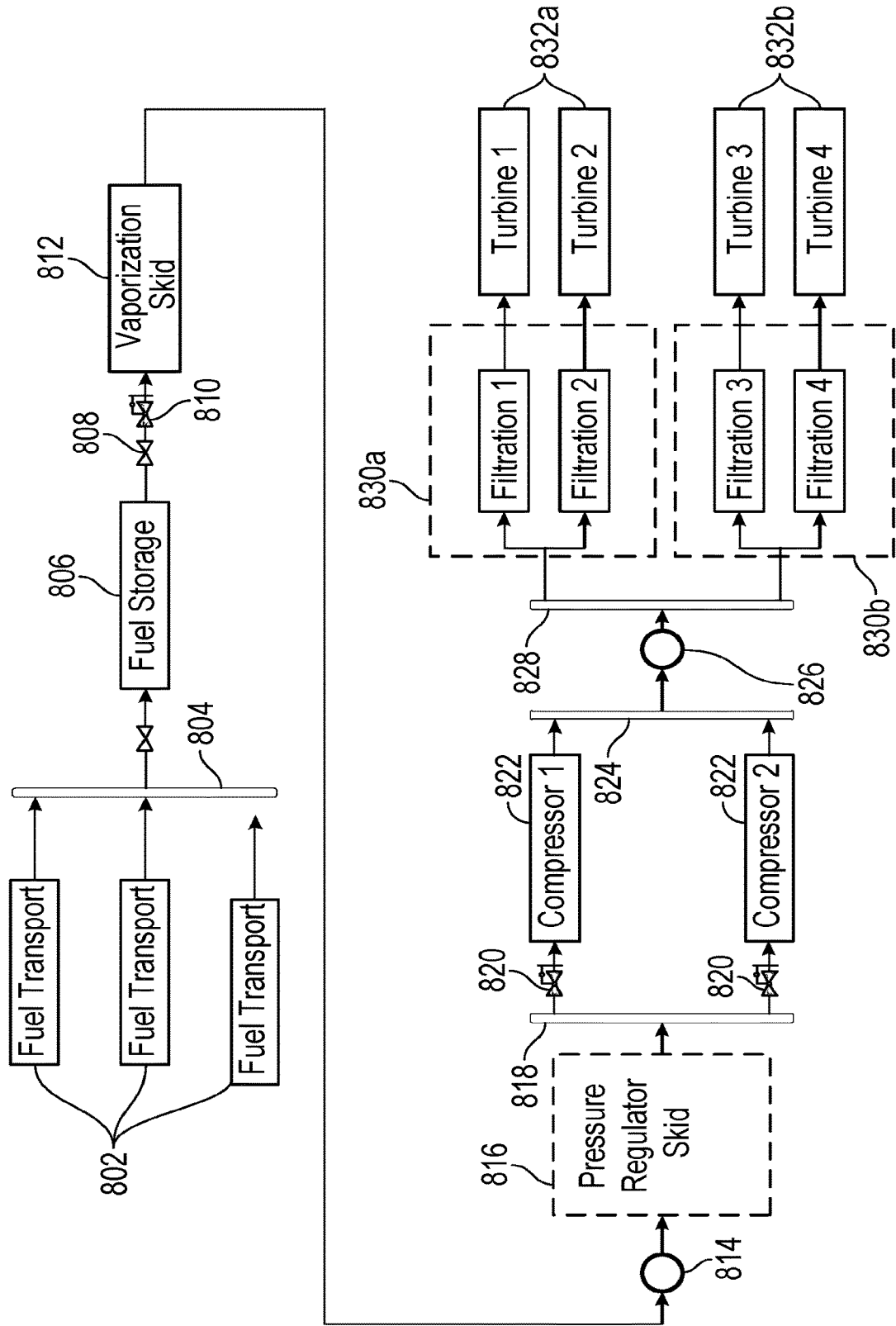
FIG. 8 is schematic of an example of a gas compression system according to various embodiments.

FIG. 8 is a schematic embodiment of a system for fueling the natural gas turbine generators 832a, 832b when a main gas line is not available or not used. The system of FIG. 8 includes a vaporization skid 812, which allows use of liquid natural gas or any other liquid combustible fuel, and which in one example is a lean premixing prevaporizing system. This system can also utilize the previously mentioned embodiments of gas filtering, including the use of a first three phase separator 814 upstream from the pressure regulator skid 816, and a second three phase separator 826 downstream from the compressor outlet manifold 824 and upstream from the filtration inlet manifold 828. The embodiment can further include discrete filtration trailers 830a, 830b. Moreover, the compressors 822 can function in similar fashion, each including an associated regulator 820. Large particulate, water, and condensate filtering can be in the form of single vessel, and/or multiple vessels, with the vessels either stand alone or combined on other trailers. It is also possible to have no sand traps and/or three phase separators in the system at all, or to remove the final filtration units. In high quality clean fuels, the three phase separators 814, 826 may not be needed. Also the regulators 810 could be built into the vaporizers 812. Finally the vaporized fuel could be vaporized at a pressure suitable for use by the turbine generators so that a compressor 822 is not also needed.

Included in FIG. 8 is an example of a fuel storage container 806. The fuel storage container 806 can be an enclosed or pressurized vessel, which would be used to temporary store liquid fuels for use by the vaporizer 812 or gaseous fuels which can be compressed and used in compressions systems without a vaporizer 812. The fuel storage container 806 can be used on models where a main gas line (sales line) is utilized. With the use of onsite fuel storage, multiple stages worth of turbine fuel could be stored to allow long term operation if there is a disruption with fuel delivery. In an example, a stage is a section of a formation that is being hydraulically fractured and needs to be uninterrupted for the best results. Disruption of fuel delivery could be due to poor weather, blocked roads, traffic, or poor logistics. A ready store of fuel could also be needed if the system is using a sales line and the pressure temporarily drops too low to utilize or if the line needs closed for maintenance purposes. This provides for continuous and uninterrupted operation, thereby saving time and money.

The natural gas being provided to the compressors and gas compression system can be from a pipeline (sales line, main gas line, producing wellhead) or it can be shipped to the well site via tankers as LNG (liquid natural gas) or CNG (compressed natural gas). As shown fuel transport vehicles 802 provide fuel to a fuel transfer manifold 804, which routes gas to a fuel storage vessel 806. A valve 808 and regulator 810 can then control the flow of natural gas to the vaporization skid 812 and other downstream components. Other gaseous or liquid fuels can be used as well. In an example, the amount of filtration largely depends on the quality of natural gas that the well owner can provide. If the gas is expected to contain large amounts of water, three phase separators can be added, starting at one, and adding more anywhere in the gas lines as needed. If the natural gas is unfiltered and will contain sediments, one or more sand traps can be added to capture the particulates to prevent them from reaching the turbines. Each turbine can also have a specialized filtration unit that is able to clean out finer particles as well as any water or condensate that is still in the gas. However, if the natural gas is cleaned and pre-filtered enough from the well owner, it is possible to omit them from the layout of the gas compression system.

It is also possible to bypass the compressors 822 in certain conditions. For example, if the gas pressure flowing from the main line is above 150 psi and holding steady, the turbines 832a, 832b would be able to use the natural gas straight from the line. However any fluctuation in pressure could cause the turbines to shut down, and it may not be a reliable solution. The compressors, filtering units, three phase separators, sand traps, and regulation skids can be skid mounted, trailerized, or bodyload units. For the purpose of clarification, the gas manifolds 804, 818, 824, 828 are shown separate from the equipment in FIG. 8, but can be integrated into or mounted on the associated pieces of equipment. The final filtering units 830a, 830b are often shown as having two or three mounted on a single trailer. They can also each be mounted on their own trailers or as stand-alone skids. They can also be designed to be larger so a single unit can perform the final filtering for multiple turbine generators if it is desired.

In embodiments, an electric starter for the motor can be integrated into the compressors 822, or it can be mounted externally with power cables connecting it to the unit. It can be externally mounted into the EER (electronic equipment room) or auxiliary unit. With the motor starter mounted on the compression unit 822 itself, one set of three phase power cables can be connected to the unit. If the starter is external to the unit, in the EER for example, there could be two sets of power cables running to the unit; power for the motor from the starter, and power for onboard electronics and small motors.

In the fueling system, the connectors can be of different sizes and flange ratings, some of which include 4" 300# RF Flanges. Adaptors can be used to couple together different sized/type connectors to make up connections between pieces of equipment and to assemble the system. In an example, supply side connectors could be 4" 300# RF Flange, thereby allowing connection between braided stainless steel hoses. Also, multiple sections of hose can be used to add lengths, instead of having a single braided hose between each section. One example of a segment length of hose is a length of 20 feet.

Figure 9:
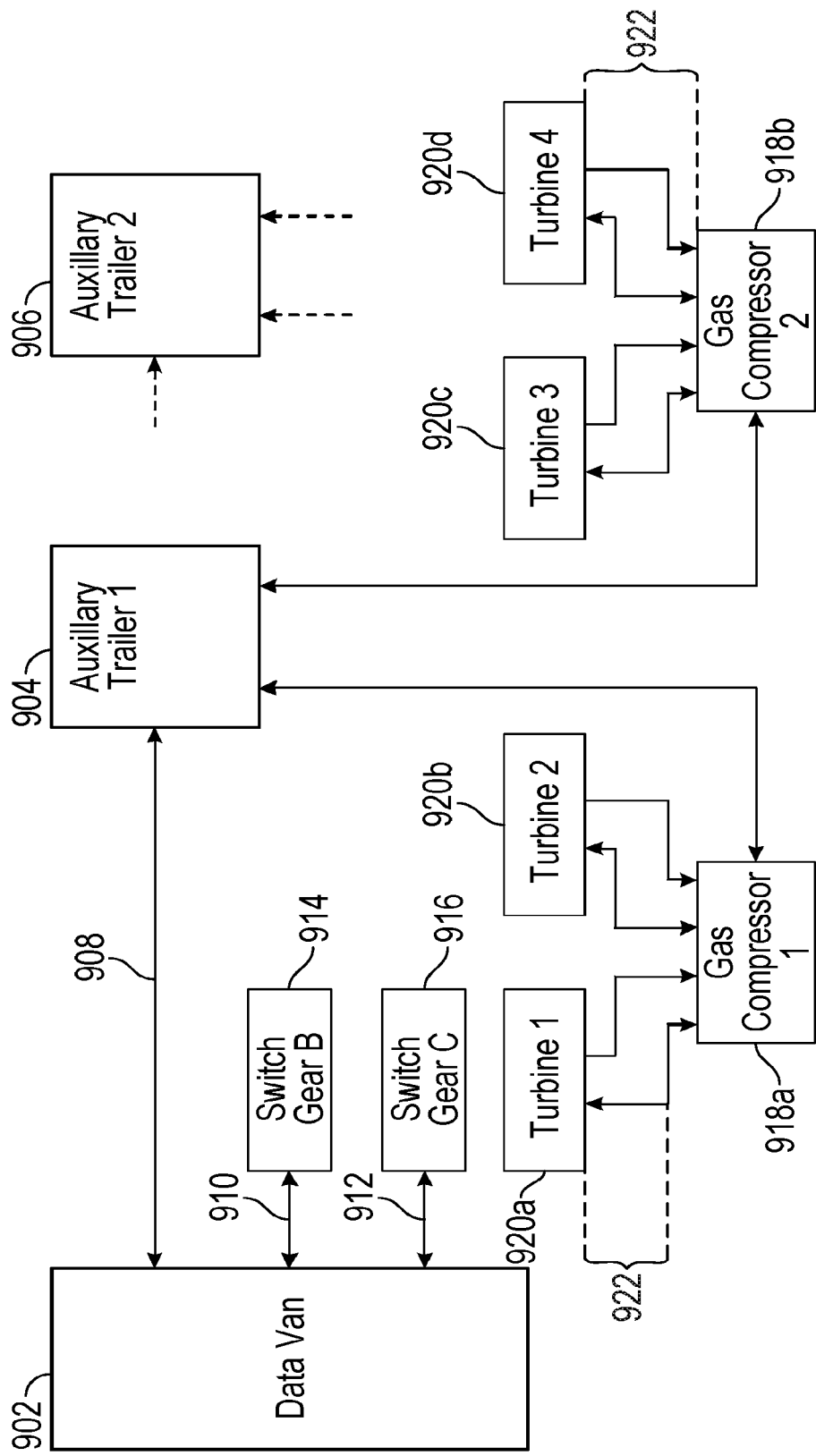
FIG. 9 is a schematic of an example of a communications circuit for a gas compression system according to various embodiments.

FIG. 9 is a schematic depiction of an example of a communications circuit for a gas compression system. The arrows provided between images of equipment represent examples of communication cables. An emergency shutdown system selectively blocks electric power to the system's electric compressors, and which is referred to as an Emergency Power Off ("EPO") system. When using natural gas fueled compressors, the emergency shutdown system can be called an Emergency Shut Down ("ESD") system. Examples of cables for Ethernet and the EPO/ESD signals are represented by double headed arrows 908 between the data van 902 and Auxiliary Trailer 1 904, between Auxiliary Trailer 1 904 and Gas Compressor 1 918a, between Auxiliary Trailer 1 904 and Gas Compressor 2 918b, between Gas Compressor 1 918a and Turbine 1 920a, between Gas Compressor 1 918a and Turbine 2 920b, between Gas Compressor 2 918b and Turbine 3 920c, and between Gas Compressor 2 918b and Turbine 4 920d. Optionally, controls are provided in the data van 902 for disconnecting all power to the equipment ("shut down controls"), which in an embodiment includes a dedicated switch or button. The shut down controls can be the same as the EPO/ESD signal described above, or it can comprise separate controls. The shut down controls can be designed as a "normally closed circuit," meaning that when activated the shut down controls open a circuit powering equipment in the gas compression system (breaks the analog signal) to power down the equipment. The use of a normally closed circuit is a failsafe, so that if a cable or component is severed or disconnected, all of the equipment being powered by that circuit will shut down thereby indicating a failure in the circuit. The use of a failsafe system provides some assurance the system operates when needed. If the circuit were designed as a "normally open circuit," then activating the shutdown controls would close the circuit to initiate the EPO/ESD. In that embodiment, a failure or severed connection in the EPO/ESD circuit could go undetected, and the EPO may not activate when needed. Embodiments of the system described herein employ a failsafe, analog EPO/ESD signal with a dedicated discrete pair of wires embedded in the Ethernet cable for communications. Alternatives include a digital signal using serial or Ethernet communications, a normally open analog signal, as well as a dedicated cable instead of being embedded as a discrete pair as part of the Ethernet communications cable.

Fire Stop analog signal cables from the turbines 920a, 920b, 920c, 920d to shut down the compressors 918a, 918b in the case of a turbine fire are represented by single headed arrows. These signal cables shut down the compressors if the turbines 920a, 920b, 920c, 920d detect a fire, so fuel will not be continuously pumped into the fire. The Fire Stop analog signals are directed from Turbine 1 920a to Gas Compressor 1 918a, from Turbine 2 920b to Gas Compressor 1 918a, from Turbine 3 920c to Gas Compressor 2 918b, and from Turbine 3 920c to Gas Compressor 2 918b. The Fire Stop analog signal of FIG. 9 is designed as a normally closed circuit for the same reasons as stated previously. However, the Fire Stop analog signal could also have been designed as a normally open analog signal, or a digital signal using Ethernet or serial communications protocols. While the Fire Stop analog signal can be communicated along a separate dedicated cable, the signal could also be embedded in the Ethernet communications cable from the turbines.

Still referring to FIG. 9, serial RS-485 communications between the data van 902 and Switch Gear B 914 and Switch Gear C 916 are represented by double headed arrows 910, 912. In the illustrated example, this signal opens all of the electrical circuit breakers if the EPO or ESD is triggered. Another embodiment is that all of the communications between the data van 902 and Switch Gear B 914 and Switch Gear C 916 are via Ethernet. This setup can also be used for one or more switch gears. For example, two or three switch gears can be used. This can be designed using RS-232, RS-485, or RS-422, as well as Ethernet or analog signals. This ensures that the hydraulic fracturing equipment is shut down as well. That is, if there is a fire or other hazard on the hydraulic fracturing side of operations, the same shutdown procedure can be used to shut down all of the hydraulic fracturing equipment even if no hazards or other problems are detected with the gas compression or power generation equipment.

Auxiliary Trailer 1 904, Auxiliary Trailer 2 906, Gas Compressor 1 918a, Gas Compressor 2 918b, Turbine 1 920a, Turbine 2 920b, Turbine 3 920c, Turbine 920d, and data van(s) 902 can all contain Ethernet switches to create a single communications network. In the example of FIG. 9, Auxiliary Trailer 1 904 and Auxiliary Trailer 2 906 do not add or read any information, but act as a hub to extend the network and help with cable routing. One, both, or neither of Auxiliary Trailer 1 904 and Auxiliary Trailer 2 906 can be used to complete the network. In an embodiment, any piece of equipment shown in FIG. 9 can be in communication with any other piece of equipment, in any order, using Ethernet communication cables and network switches. Further examples exist where no serial cables are used for communications for the gas compression and EPO/ESD network.

The information relayed through the network of FIG. 9 can be viewed through HMIs that are either touch screen or require peripheral devices for interface (i.e. mouse or keyboard). Certain networked PC and/or laptop computers can also be used to display and send information through this network. In an alternative, the HMIs and computers are located in one or more of the data van 902, Gas Compressor 1 918a, Gas Compressor 2 918b, Turbine 1 920a, Turbine 2 920b, Turbine 3 920c, and Turbine 4 920d. In embodiments, the information and controls system may be available in Auxiliary Trailer 1 904, Auxiliary Trailer 2 906, blenders, hydration units, or for off-site computers receiving information through the data van's satellite network. It is also possible to connect external computers into an Ethernet switch on the network for access. The Ethernet network for the gas compression and power generation monitoring and control can be either wired or wireless. The compression units 918a, 918b can be on a mobile platform, being trailer mounted, body load mounted, or skid mounted. If a trailer is used, it can be single, double, or triple axle.

Incorporated onto the same trailer as the compressors can be the gas pressure regulators, sand traps, water separators, and gas filtration components, all described in more detail herein. These components can be added before the gas inlet and/or after the gas outlet of the compressor for pre-compressed and post-compressed filtering of the natural gas. The voltage transformer for the power supply can have several different configurations including being on the unit itself or external and being connected by DLO (diesel locomotive cables). Overhead power lines can also be used such as All Aluminum Alloy Conductor (AAAC), All Aluminum Conductor (AAC), Aluminum Conductor Steel Reinforced (ACSR), Aluminum Conductor Steel Supported (ACSS), Aluminum Conductor Alloy Reinforced (ACAR), Aluminum Conductor Composite Reinforced (ACCR) or Aluminum Conductor Composite Core (ACCC). This can be a stand alone transformer (skidded, trailerized, body mounted), a transformer that is part of a turbine, an EER (electronic equipment room), or auxiliary unit such as the one designed to run the electric frac blender. The compression unit can be designed to be powered from a 120V, 208V, 240V, 277V, 480V, 600V, 4,160V, 13.8 kV, or any other common three phase AC electric supply in either a wye or delta transformer configuration. It could also be powered from a single phase or DC power supply. The electric motor can be an AC induction motor (asynchronous motor) in either a squirrel cage rotor or wound rotor configuration, a synchronous motor which can be self-excited or directly excited (like permanent magnet motors), or a DC motor that contains either brushes or is brushless. Steel braided hoses or rigid iron pipe could be used to contain and transport natural gas between components of the compression system.

Figure 10:
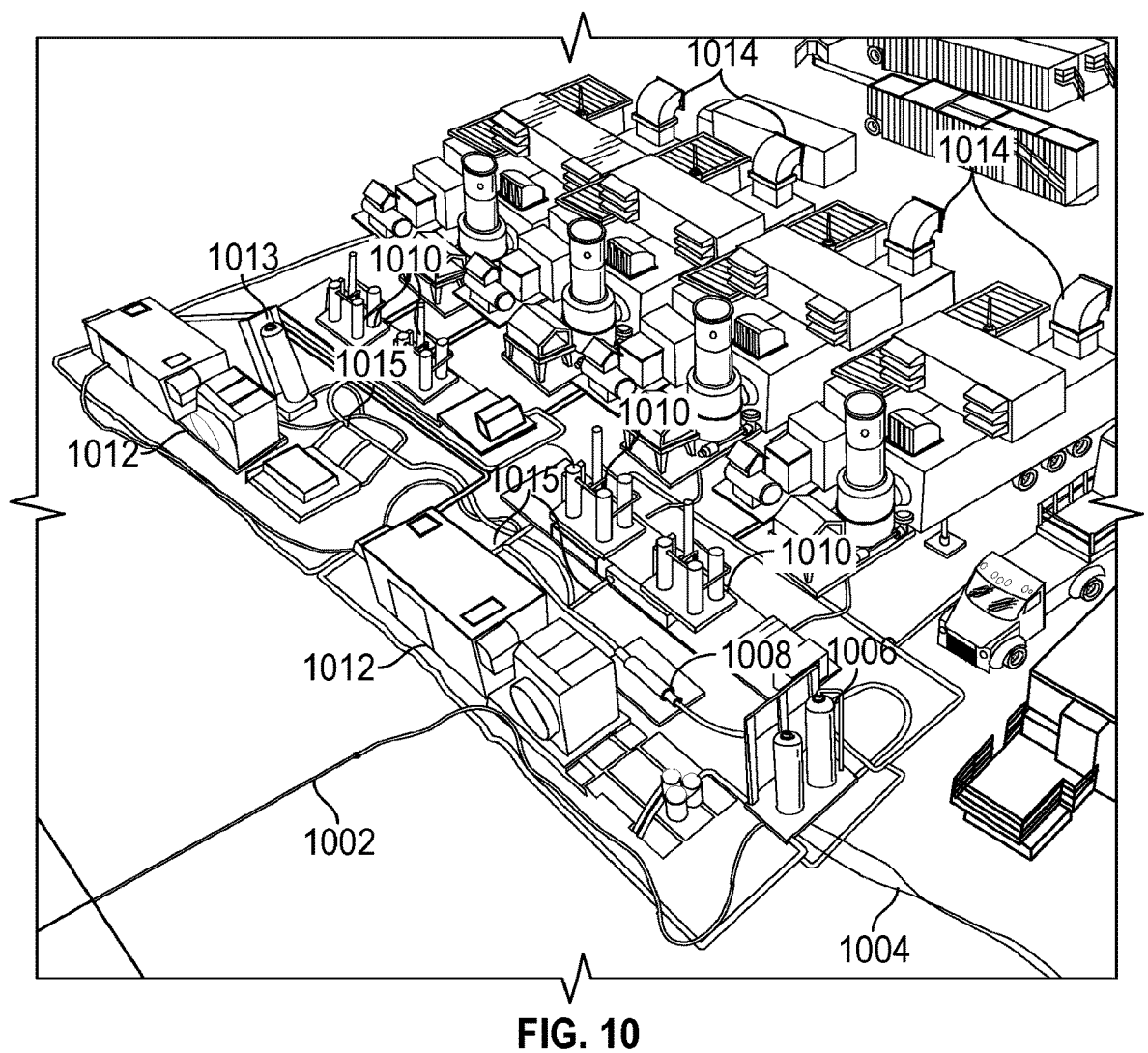
FIG. 10 is a perspective plan view of an example of a gas compression and power generation system according to various embodiments.

FIG. 10 shows in a perspective plan view one example of the gas compression and power generation system. Gas from a main gas line 1002 can pass to a sand trap and separator assembly 1006. Ethernet/EPO cables 1004 can allow communication from one or more auxiliary trailers to the compressors 1012. A pressure regulator skid 1008 can regulate the pressure of the gas stream before the stream reaches the compressors 1012 as described more thoroughly above. One or more filters 1010 can remove sand and other particulates from the gas stream. One or more manifolds 1015 can merge, divide, or direct the gas stream as appropriate. Another separator 1013 can be positioned downstream from the compressors 1013 to further remove liquids from the compressed stream. The gas stream can then be directed to one or more natural gas turbine generators 1014, as described more thoroughly above.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of providing electric power to hydraulic fracturing equipment, the method comprising:

releasing a natural gas stream to a turbine gas line, the turbine gas line including one or more natural gas turbine generators;

reducing the pressure of the natural gas stream using a plurality of pressure regulators;

compressing the natural gas stream using a plurality of natural gas compressors, the pressure of each portion of the natural gas stream entering each compressor regulated by a corresponding one of the plurality of pressure regulators so that the pressure of the natural gas stream entering each compressor can be individually raised or lowered as appropriate even if a compressor inlet manifold unevenly distributes gas to each compressor;

merging the portion of the natural gas stream leaving each of the plurality of natural gas compressors through a compressor outlet manifold;

combusting natural gas from the natural gas stream in the one or more natural gas turbine generators to generate the electric power; and providing the electric power to an electric motor to power the hydraulic fracturing equipment.

2. The method of claim 1, further comprising:

removing particulates from the natural gas stream; and removing liquids from the natural gas stream.

3. The method of claim 2, further comprising:

heating the natural gas stream to prevent the natural gas stream from condensing.

4. The method of claim 1, wherein at least one of the plurality of natural gas compressors is disposed on a mobile trailer.

5. The method of claim 1, further comprising:

filtering the natural gas stream through a gas filtration unit.

\* \* \* \* \*